US012673563B2

(12) United States Patent
Wu et al.

(10) Patent No.: US 12,673,563 B2
(45) Date of Patent: Jul. 7, 2026

(54) WIRELESS CHARGING PARKING SPACE RECOMMENDATION METHOD AND SYSTEM

(71) Applicant: Yinwang Intelligent Technologies Co., Ltd., Shenzhen (CN)

(72) Inventors: Zixian Wu, Shanghai (CN); Linghu Qu, Shenzhen (CN); Yongyou Zhou, Shanghai (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 167 days.

(21) Appl. No.: 18/221,524

(22) Filed: Jul. 13, 2023

(65) Prior Publication Data

US 2023/0360528 A1 Nov. 9, 2023

Related U.S. Application Data

(63) Continuation of application No. PCT/CN2021/071520, filed on Jan. 13, 2021.

(51) Int. Cl.
*B60L 53/126* (2019.01)
*B60L 53/12* (2019.01)
(Continued)

(52) U.S. Cl.
CPC ............. *B60L 53/126* (2019.02); *B60L 53/12* (2019.02); *B60L 53/36* (2019.02); *B60L 53/65* (2019.02);
(Continued)

(58) Field of Classification Search
CPC ........ B60L 53/126; B60L 53/12; B60L 53/36; B60L 53/65; B60L 53/66; G08G 1/143; G08G 1/145; G08G 1/141; H02J 50/90
See application file for complete search history.

(56) References Cited

U.S. PATENT DOCUMENTS 4,347,472 A * 8/1982 Lemelson ............. G07F 15/003
320/108
4,800,328 A * 1/1989 Bolger .................... B60L 5/005
320/135
(Continued)

FOREIGN PATENT DOCUMENTS

CN 107651013 A * 2/2018 .............. B60L 11/18
CN 109255958 A * 1/2019 ............. G08G 1/015
(Continued)

OTHER PUBLICATIONS

Translation of CN-109255958-A, 12 pages (Year: 2019).*
Translation of CN-107651013-A, 11 pages (Year: 2018).*

*Primary Examiner* — Dale W Hilgendorf
(74) *Attorney, Agent, or Firm* — WOMBLE BOND DICKINSON (US) LLP

(57) ABSTRACT

A wireless charging parking space recommendation method is disclosed. The method includes: When a vehicle enters a parking lot, vehicle information is reported to the parking lot. A parking lot server compares and matches the vehicle information with pre-stored wireless charging parking space information, and comprehensively determines, based on the vehicle information, whether an available charging parking space exists in the current parking lot, selects an optimal parking space, and pushes a path to the optimal parking space and a parking manner to a vehicular device. A server, a vehicular device, a system, a vehicle, a computer-readable storage medium, a computer program product, a control unit, and a chip are also disclosed.

18 Claims, 12 Drawing Sheets

(51) Int. Cl.

| | |
|---|---|
| *B60L 53/36* | (2019.01) |
| *B60L 53/65* | (2019.01) |
| *B60L 53/66* | (2019.01) |
| *G08G 1/14* | (2006.01) |
| *H02J 50/90* | (2016.01) |

(52) U.S. Cl.
CPC .............. *B60L 53/66* (2019.02); *G08G 1/143* (2013.01); *G08G 1/145* (2013.01); *H02J 50/90* (2016.02); *G08G 1/141* (2013.01)

(56) References Cited

U.S. PATENT DOCUMENTS

| | | | | |
|---|---|---|---|---|
| 5,617,003 | A * | 4/1997 | Odachi | H01M 10/44 |
| | | | | 320/108 |
| 5,654,621 | A * | 8/1997 | Seelig | H01F 38/14 |
| | | | | 320/108 |
| 5,703,461 | A * | 12/1997 | Minoshima | B60L 53/126 |
| | | | | 320/108 |
| 5,821,731 | A * | 10/1998 | Kuki | B60L 53/14 |
| | | | | 320/108 |
| 8,466,654 | B2 * | 6/2013 | Cook | H01F 38/14 |
| | | | | 320/108 |
| 8,489,315 | B2 * | 7/2013 | Yamamoto | B60W 50/0097 |
| | | | | 320/108 |
| 9,254,755 | B2 * | 2/2016 | Bachmaier | B60L 53/12 |
| 9,853,488 | B2 * | 12/2017 | Fincham | B60L 53/65 |
| 10,500,964 | B2 * | 12/2019 | Ichikawa | B60L 53/122 |
| 10,821,844 | B2 * | 11/2020 | Roehrl | B60L 53/36 |
| 2010/0117596 | A1 * | 5/2010 | Cook | H01F 38/14 |
| | | | | 320/108 |
| 2010/0161217 | A1 * | 6/2010 | Yamamoto | B60W 50/0097 |
| | | | | 701/408 |
| 2013/0076296 | A1 * | 3/2013 | Ushiroda | B60L 53/30 |
| | | | | 320/109 |
| 2014/0292270 | A1 * | 10/2014 | Ichikawa | B60L 53/122 |
| | | | | 320/108 |
| 2018/0114438 | A1 * | 4/2018 | Rajagopalan | G08G 1/144 |
| 2018/0373249 | A1 * | 12/2018 | Choi | B60W 30/06 |
| 2020/0198489 | A1 * | 6/2020 | Yoon | B60L 53/36 |
| 2020/0279196 | A1 * | 9/2020 | Karaburun | G06Q 10/02 |
| 2020/0311624 | A1 * | 10/2020 | Noguchi | G06Q 30/0284 |
| 2021/0155108 | A1 * | 5/2021 | Martin | B60L 53/12 |
| 2021/0221244 | A1 * | 7/2021 | Kuhr | B60L 53/65 |
| 2022/0073057 | A1 * | 3/2022 | Sakai | H02J 50/10 |
| 2023/0148114 | A1 * | 5/2023 | Hiei | B60W 50/14 |
| | | | | 340/932.2 |
| 2023/0223797 | A1 * | 7/2023 | He | H02J 50/10 |
| | | | | 320/108 |

FOREIGN PATENT DOCUMENTS

| | | |
|---|---|---|
| CN | 110228547 A | 9/2019 |
| CN | 111591153 A | 8/2020 |

* cited by examiner

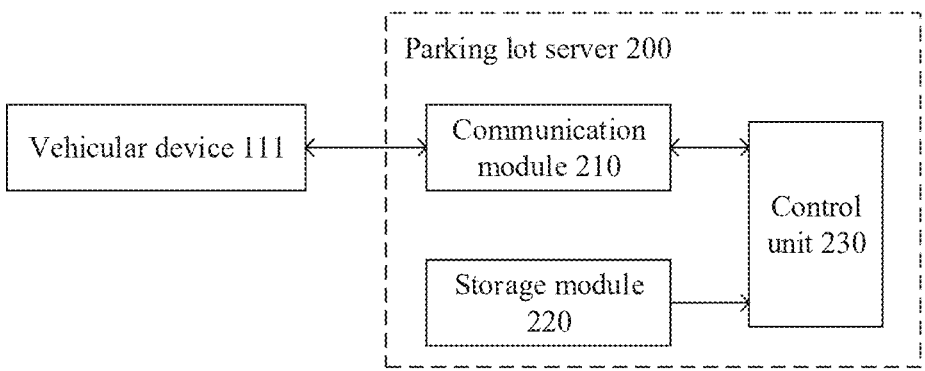
FIG. 3-a

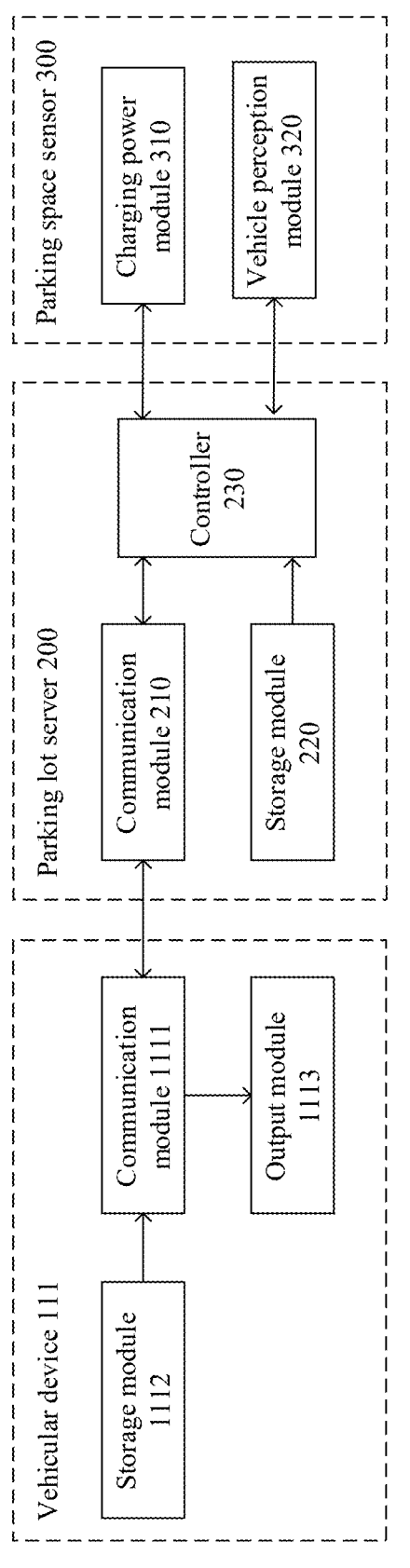
FIG. 3-b

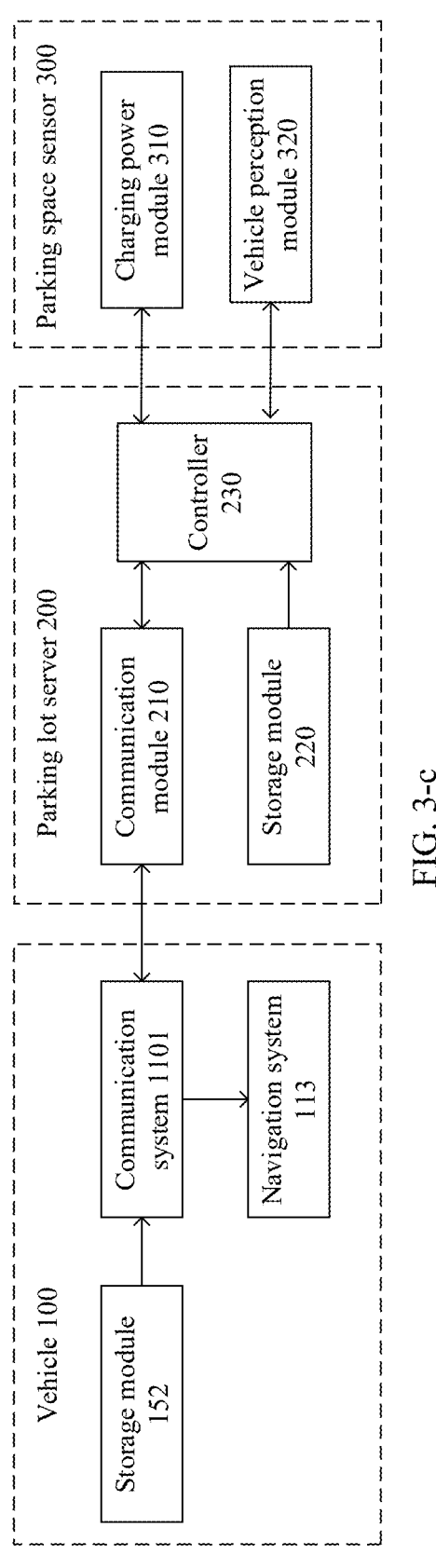
FIG. 3-c

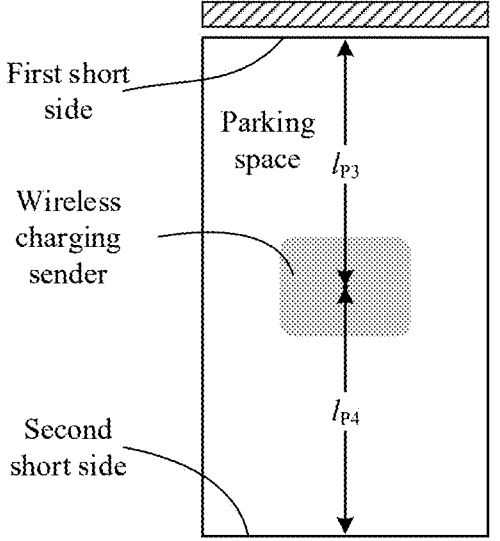
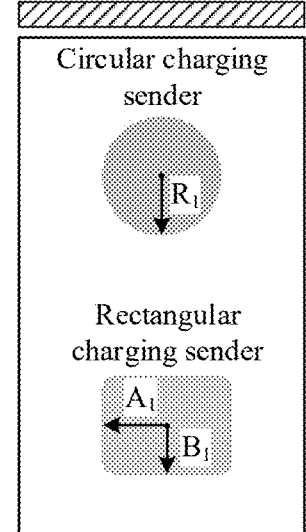
First short
side
Parking
space    $l_{P3}$
Wireless
charging
sender
Second
short side
$l_{P4}$
Circular charging
sender
$R_1$
Rectangular
charging sender
$A_1$
$B_1$
FIG. 5
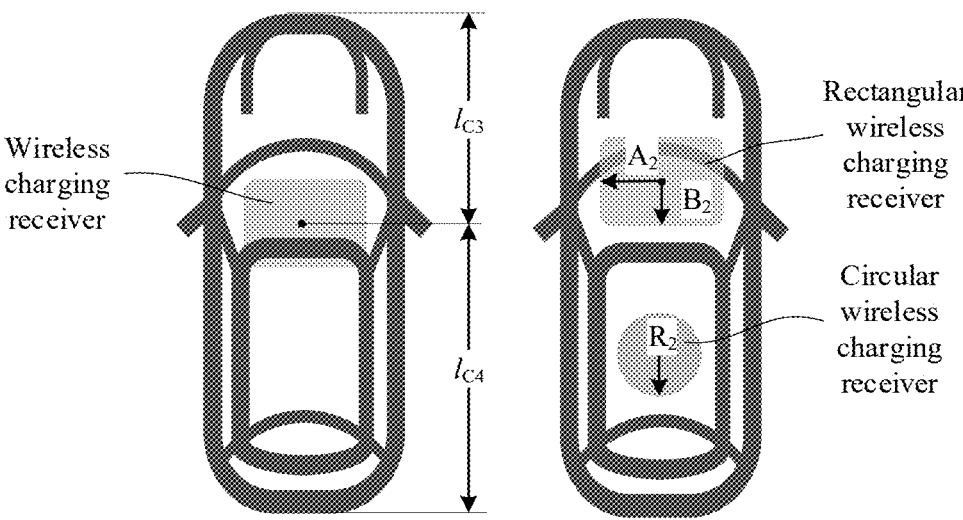
Wireless
charging
receiver
$l_{C3}$
$l_{C4}$
Rectangular
wireless
charging
receiver
$A_2$
$B_2$
Circular
wireless
charging
receiver
$R_2$
FIG. 6

S404
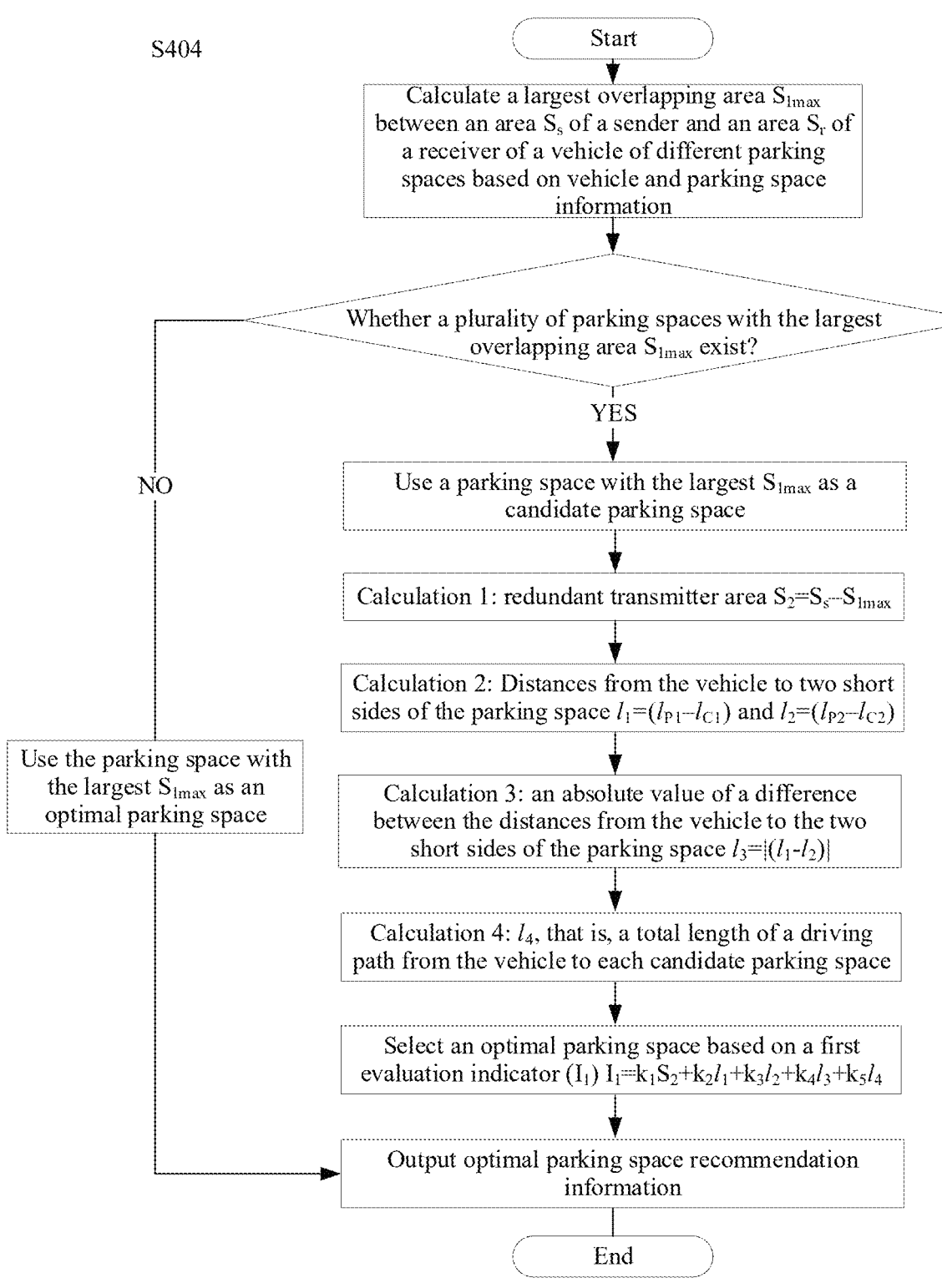
FIG. 8-a

S404
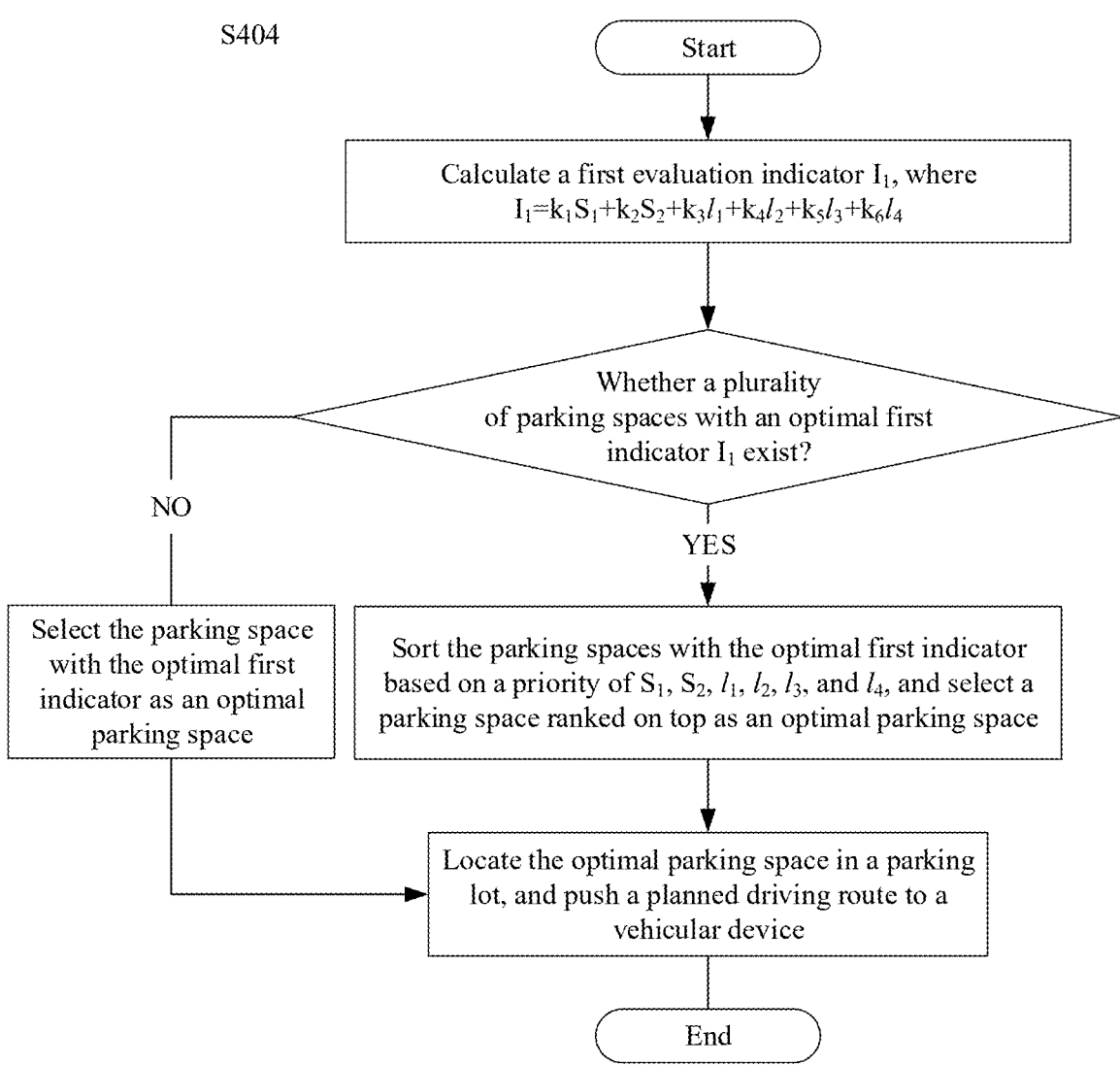
FIG. 8-b

WIRELESS CHARGING PARKING SPACE RECOMMENDATION METHOD AND SYSTEM

CROSS-REFERENCE TO RELATED APPLICATIONS

This application is a continuation of International Application No. PCT/CN2021/071520, filed on Jan. 13, 2021, the disclosure of which is hereby incorporated by reference in its entirety.

TECHNICAL FIELD

This application relates to a parking recommendation method and system, and in particular, to a parking recommendation method and system for a parking space with a wireless charging function.

BACKGROUND

In the face of energy and environmental protection problems, governments and automobile enterprises are vigorously promoting electric vehicles. Both pure electric vehicles and plug-in hybrid vehicles have large-capacity power batteries and need to be connected to an external power grid to charge the power batteries. Currently, a mainstream charging manner of an electric vehicle is wired charging. Although the method is mature in technology and is simple and direct, the method has many disadvantages of inconvenient use. Accordingly, research on a charging manner of an electric vehicle is also very active. A wireless charging technology based on a fixed parking space is one of charging technologies that have the highest value of application. This charging manner does not increase a floor area of a parking space, reduces manual operations, and has advantages of high safety and convenience. In addition, this static wireless charging technology is relatively mature and has great commercial promotion value.

To implement the wireless charging technology, energy needs to be transferred between a sender and a receiver, and accuracy of aligning a charging transmit coil with a charging receive coil affects charging efficiency. Due to different spatial arrangement manners in various vehicle models, the wireless charging receiver may be mounted at the front or rear of a chassis of the vehicle. A ground sender is not necessarily mounted at the center of the parking space, and the sender may have different sizes.

In the face of such problems, if a driver parks the vehicle into a parking space in an incorrect direction, although the charging transmit coil and the charging receive coil can be aligned with each other, the vehicle may exceed the parking space, affecting parking or passing of another vehicle. The driver needs to drive the vehicle out of the parking space, turn an orientation of the vehicle, and then park the vehicle again. This not only affects parking efficiency of a user, and possibly causes vehicle congestion, but also is prone to a safety problem such as a vehicle collision.

This application provides a wireless charging parking space recommendation method, to resolve problems of matching between a wireless charging vehicle and a parking space and parking manner selection.

SUMMARY

A first aspect of this application provides a parking recommendation method. The parking recommendation method may be applied to a parking recommendation system, and the parking recommendation system includes a vehicular device and a server. The server includes a first communication module, a first storage module, and a first controller. The first storage module stores parking space information. A parking space includes a wireless charging sender. The vehicular device includes a second communication module and a second storage module. The second storage module stores first vehicle information of a first vehicle. The first vehicle includes a wireless charging receiver.

The parking recommendation method includes:

obtaining the first vehicle information of the first vehicle;

identifying, with reference to the first vehicle information and the parking space information, a wireless charging parking space that meets a parking requirement of the first vehicle; and when the wireless charging parking space that meets the parking requirement of the first vehicle exists, sending first parking guidance information to the first vehicle.

In an embodiment, with reference to the first aspect, in a first possible implementation, the first vehicle information includes size information of the first vehicle.

In an embodiment, with reference to the first possible implementation of the first aspect, in a second possible implementation, the first vehicle information further includes size and position information of the wireless charging receiver in the first vehicle.

According to the first and second implementations of the first aspect, several implementations of the first vehicle information are provided, to increase diversity of solutions. It should be noted that information in the second implementation of the first aspect is more complete, and this is more conducive to selecting a parking space that better matches the first vehicle.

In an embodiment, with reference to the first aspect, in a third possible implementation, before the identifying, with reference to the first vehicle information and the parking space information, a wireless charging parking space that meets the parking requirement of the first vehicle, the method further includes: obtaining parking space information.

It should be noted that a sequence of obtaining the parking space information and obtaining the first vehicle information is not limited in this application.

In an embodiment, with reference to the third possible implementation of the first aspect, in a fourth possible implementation, the parking space information includes size and position information of at least one parking space.

In an embodiment, with reference to the fourth possible implementation of the first aspect, in a fifth possible implementation, the parking space information further includes size and position information of the wireless charging sender of the at least one parking space.

In an embodiment, with reference to the first aspect, in a sixth possible implementation, the identifying a wireless charging parking space that meets a parking requirement of the first vehicle includes: identifying an available wireless charging parking space as a candidate parking space.

In an embodiment, with reference to the sixth possible implementation of the first aspect, in a seventh possible implementation, the identifying an available wireless charging parking space includes: identifying an idle wireless charging parking space.

It should be noted that the idle wireless charging parking space may be identified by using a sensing apparatus on the parking space.

In an embodiment, with reference to the sixth possible implementation of the first aspect, in an eighth possible implementation, based on the parking recommendation method, the identifying an available wireless charging parking space includes: identifying a wireless charging parking space that meets a size requirement of the first vehicle; and the identifying a wireless charging parking space that meets a size requirement of the first vehicle includes: obtaining a first vehicle length and a second vehicle length of the first vehicle; selecting a parking space whose first parking space length is greater than the first vehicle length and whose second parking space length is greater than the second vehicle length as the candidate parking space, where the first vehicle length is the larger length of a third vehicle length and a fourth vehicle length; the second vehicle length is the smaller length in the third vehicle length and the fourth vehicle length; the third vehicle length is a longitudinal distance from a center of the wireless charging receiver of the first vehicle to a head of the first vehicle; the fourth vehicle length is a longitudinal distance from the center of the wireless charging receiver of the first vehicle to a rear of the first vehicle; the first parking space length is the larger length of a third parking space length and a fourth parking space length; the second parking space length is the smaller length in the third parking space length and the fourth parking space length; the third parking space length is a longitudinal distance from a center of the wireless charging sender of a first parking space to a first short side of the first parking space; and the fourth parking space length is a longitudinal distance from the center of the wireless charging sender of the first parking space to a second short side of the first parking space.

It should be noted that when the parking space meets the size requirement of the first vehicle, the first vehicle can park into the parking space, and when the first vehicle is at an appropriate parking position, the head or the rear does not exceed a parking space line.

In an embodiment, with reference to the eighth possible implementation of the first aspect, in a ninth possible implementation, the first short side is a side that is of the first parking space and that does not allow the first vehicle to enter; and the second short side is a side that is of the first parking space and that allows the first vehicle to enter.

It should be noted that there is usually an obstacle such as a roadblock, a limiting apparatus, or a wall near the short side that does not allow the first vehicle to enter, and the first vehicle cannot park into the parking space through the short side. In the ninth possible implementation of the first aspect, an actual situation of the parking space is considered, and operability of the solution is increased.

In an embodiment, with reference to the sixth possible implementation of the first aspect, in a tenth possible implementation, based on the parking recommendation method, the identifying a wireless charging parking space that meets a parking requirement of the first vehicle further includes: selecting an optimal parking space for the first vehicle.

In an embodiment, with reference to the tenth possible implementation of the first aspect, in an eleventh possible implementation, the selecting an optimal parking space for the first vehicle includes: calculating a first area of at least one candidate parking space, where the first area is an area of an overlapping part between projections of a first receiver and a first sender on ground when a center of the first receiver of the first vehicle overlaps a center of the first sender of each candidate parking space; and selecting the candidate parking space having the largest first area as the optimal parking space.

It should be noted that, because wireless charging efficiency of the vehicle is positively correlated with the first area, selecting a parking space with a larger first area for wireless charging of the vehicle helps improve charging efficiency of the wireless charging receiver of the vehicle.

In an embodiment, with reference to the eleventh possible implementation of the first aspect, in a twelfth possible implementation, after the selecting the candidate parking space having the largest first area as the optimal parking space, the method further includes: calculating a first evaluation indicator of at least one optimal parking space; and selecting the optimal parking space having the optimal first evaluation indicator as the optimal parking space.

In an embodiment, with reference to the twelfth possible implementation of the first aspect, in a thirteenth possible implementation, the first evaluation indicator includes a second area; and the second area is a difference between an area of the first sender and the first area of each candidate parking space.

It should be noted that, the second area may reflect, to some extent, a redundant sender area that is of the wireless charging sender and that does not contribute to wireless charging of the vehicle. Therefore, matching a parking space with a relatively small second area for the vehicle helps reduce a waste of energy.

In an embodiment, with reference to the twelfth possible implementation of the first aspect, in a fourteenth possible implementation, the first evaluation indicator includes a first distance and a second distance, where the first distance is a difference between a first parking space length and a first vehicle length; and the second distance is a difference between a second parking space length and a second vehicle length.

It should be noted that, by considering the first distance and the second distance, cases in which a dedicated parking space for a large vehicle is matched for a small vehicle can be effectively reduced, and space utilization of the parking space can be improved.

In an embodiment, with reference to the twelfth possible implementation of the first aspect, in a fifteenth possible implementation, the first evaluation indicator includes a third distance, and the third distance is an absolute value of a difference between a first distance and a second distance.

It should be noted that, by considering the third distance, a parking space in which remaining space at a head and a rear of the vehicle is distributed more evenly may be recommended for the vehicle, so as to avoid a case in which the vehicle is placed closer to a short side of the parking space, for example, a small vehicle is placed closer to one side of a large parking space.

In an embodiment, with reference to the twelfth possible implementation of the first aspect, in a sixteenth possible implementation, the first evaluation indicator includes a fourth distance, and the fourth distance is a total length of a driving path from an entrance of a parking lot to the candidate parking space.

It should be noted that a parking space with a smaller fourth distance has a shorter driving path, so that the vehicle can be parked more quickly.

In an embodiment, with reference to the twelfth possible implementation of the first aspect, in a seventeenth possible implementation, the first evaluation indicator is obtained by performing weighted calculation on a second area, a first distance, a second distance, a third distance, and a fourth distance, where the second area is a difference between an area of the first sender and the first area of each parking space; the first distance is a difference between a first parking space length and a first vehicle length; the second distance is a difference between a second parking space length and a second vehicle length; the third distance is an absolute value of a difference between the first distance and the second distance; and the fourth distance is a total length of a driving path from an entrance of a parking lot to the candidate parking space.

In an embodiment, with reference to the tenth possible implementation of the first aspect, in an eighteenth possible implementation, the selecting an optimal parking space for the first vehicle includes: calculating a second evaluation indicator of at least one candidate parking space; and selecting the candidate parking space having the optimal second evaluation indicator as the optimal parking space.

In an embodiment, with reference to the eighteenth possible implementation of the first aspect, in a nineteenth possible implementation, the second evaluation indicator includes a first area, where the first area is an area of an overlapping part between projections of a first receiver and a first sender on ground when a center of the first receiver of the first vehicle overlaps a center of the first sender of each candidate parking space.

In an embodiment, with reference to the eighteenth possible implementation of the first aspect, in a twentieth possible implementation, the second evaluation indicator is obtained by performing weighted calculation on a first area, a second area, a first distance, a second distance, a third distance, and a fourth distance, where the first area is an area of an overlapping part between projections of a first receiver and a first sender on ground when a center of the first receiver of the first vehicle overlaps a center of the first sender of each candidate parking space; the second area is a difference between an area of the first sender and the first area of each parking space; the first distance is a difference between a first parking space length and a first vehicle length; the second distance is a difference between a second parking space length and a second vehicle length; the third distance is an absolute value of a difference between the first distance and the second distance; and the fourth distance is a total length of a driving path from an entrance of a parking lot to the candidate parking space.

According to the tenth to the twentieth possible implementations of the first aspect, a plurality of evaluation indicators for selecting the optimal parking space are provided, to increase diversity of the solutions.

In an embodiment, with reference to the first aspect, in a twenty-first possible implementation, before the sending first parking guidance information to the first vehicle, the method further includes: calculating a parking manner of an optimal parking space.

In an embodiment, with reference to the twenty-first possible implementation of the first aspect, in a twenty-second possible implementation, the calculating a parking manner of an optimal parking space includes: when a first parking condition of the optimal parking space is true, selecting forward parking as the parking manner, where
the first parking condition is {[(V4>=V3) and (P4>=P3)] or [(V3>=V4) and (P3>=P4)]}, where V3 is a third vehicle length, V4 is a fourth vehicle length, P3 is a third parking space length, and P4 is a fourth parking space length.

In an embodiment, with reference to the twenty-first possible implementation of the first aspect, in a twenty-third possible implementation, based on the parking recommendation method, the calculating a parking manner of the optimal parking space includes: when a first parking condition of the optimal parking space is false, selecting reverse parking as the parking manner, where
the first parking condition is {[(V4>=V3) and (P4>=P3)] or [(V3>=V4) and (P3>=P4)]}, where V3 is a third vehicle length, V4 is a fourth vehicle length, P3 is a third parking space length, and P4 is a fourth parking space length.

In an embodiment, with reference to the first aspect, in a twenty-fourth possible implementation, the sending first parking guidance information to the first vehicle includes: sending, to the first vehicle, position information and path planning information of a parking space that meets the parking requirement of the first vehicle.

In an embodiment, with reference to the twenty-fourth possible implementation of the first aspect, in a twenty-fifth possible implementation, the sending first parking guidance information to the first vehicle further includes: sending parking manner information of an optimal parking space to the first vehicle, where the parking manner information includes forward parking or reverse parking.

In an embodiment, with reference to the first aspect, in a twenty-sixth possible implementation, when the wireless charging parking space that meets the parking requirement of the first vehicle does not exist, second parking guidance information is sent to the first vehicle.

In an embodiment, with reference to the twenty-sixth possible implementation of the first aspect, in a twenty-seventh possible implementation, the second parking guidance information includes information notifying the first vehicle that there is no available wireless charging parking space that meets the parking requirement.

A second aspect of this application provides a server, including a communication module, a storage module, and a control module. The server can perform the method according to any one of the first aspect, or the first to the twenty-seventh implementations of the first aspect.

A third aspect of this application provides a vehicular device, including a communication module, a storage module, and a control module. The vehicular device can perform the method according to any one of the first aspect, or the first to the twenty-seventh implementations of the first aspect.

In an embodiment, with reference to the third aspect, in a first possible implementation, the vehicular device is mounted on a first vehicle, and the first vehicle includes a wireless charging receiver.

In an embodiment, with reference to the third aspect, in a second possible implementation, the vehicular device is a mobile terminal.

In an embodiment, with reference to the second possible implementation of the third aspect, in a third possible implementation, the vehicular device is a mobile phone.

A fourth aspect of this application provides a system, including the server according to the second aspect and the vehicular device according to any one of the third aspect or the first to the third implementations of the third aspect.

A fifth aspect of this application provides a vehicle, including the vehicular device according to any one of the third aspect or the first to the third implementations of the third aspect.

A sixth aspect of this application provides a computer-readable storage medium, including a program. When the program is run on a computer, the computer is enabled to perform the method according to any one of the first aspect, or the first to the twenty-seventh implementations of the first aspect.

A seventh aspect of this application provides a computer program product. When the computer program product is run on a computer, the computer is enabled to perform the method according to any one of the first aspect, or the first to the twenty-seventh implementations of the first aspect.

An eighth aspect of this application provides a control unit, including programmable instructions. When the programmable instructions are invoked, the method according to any one of the first aspect, or the first to the twenty-seventh implementations of the first aspect can be performed.

A ninth aspect of this application provides a chip. The chip is coupled to a memory, and is configured to execute a program stored in the memory, to perform the method according to any one of the first aspect, or the first to the twenty-seventh implementations of the first aspect.

BRIEF DESCRIPTION OF DRAWINGS

FIG. 3-a is a schematic diagram of a parking recommendation system according to an embodiment of this application;

FIG. 3-b is a schematic diagram of a parking recommendation system according to an embodiment of this application;

FIG. 3-c is a schematic diagram of a parking recommendation system according to an embodiment of this application;

FIG. 5 is a diagram of size information of a parking space according to an embodiment of this application;

FIG. 6 is a diagram of size information of a vehicle according to an embodiment of this application;

FIG. 8-a is a schematic flowchart of selecting an optimal parking space according to an embodiment of this application;

FIG. 8-b is another schematic flowchart of selecting an optimal parking space according to an embodiment of this application;

DESCRIPTION OF EMBODIMENTS

Figure 1:
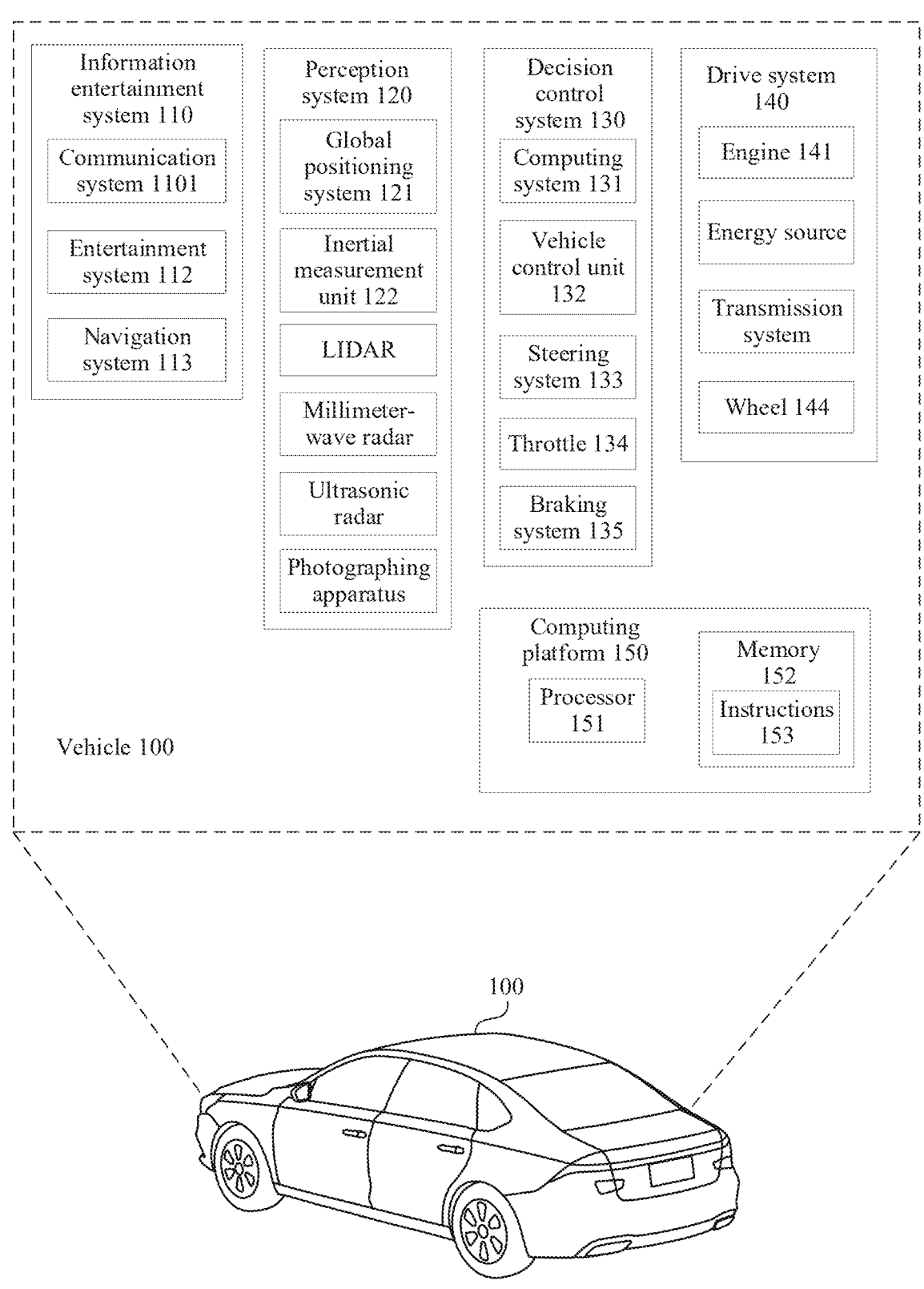
FIG. 1 is a schematic diagram of a functional framework of a vehicle 100 according to an embodiment of this application.

The following describes embodiments of this application with reference to the accompanying drawings. It is clearly that the described embodiments are merely some rather than all of embodiments of this application. One of ordinary skilled in the art may learn that, with technology development and emergence of a new scenario, the technical solutions provided in embodiments of this application are also applicable to a similar technical problem.

In this specification, claims, and accompanying drawings of this application, the terms "first", "second", and the like are intended to distinguish similar objects but do not need to be used to describe an order or sequence. It should be understood that the data termed in such a way are interchangeable in appropriate circumstances, so that embodiments described herein can be implemented in other orders than the order illustrated or described herein. In addition, the terms "include", "contain" and any other variants mean to cover the non-exclusive inclusion, for example, a process, method, system, product, or device that includes a list of operations or modules is not necessarily limited to those operations or modules, but may include other operations or modules not expressly listed or inherent to such a process, method, system, product, or device. Naming or numbering of operations in this application does not mean that the operations in the method procedures need to be performed in a time/logical order indicated by the naming or numbering. An execution order of the operations in the procedures that have been named or numbered can be changed based on a technical objective to be achieved, as long as same or similar technical effects can be achieved. Division into modules in this application is logical division. In actual application, there may be another division manner during implementation. For example, a plurality of modules may be combined or integrated into another system, or some features may be ignored or not performed. In addition, the displayed or discussed mutual coupling or direct coupling or communication connection may be implemented by using some ports, and the indirect coupling or communication connection between modules may be in an electrical form or another similar form. This is not limited in this application. In addition, modules or sub-modules described as separate components may be or may not be physically separated, or may be or may not be physical modules, or may be distributed to a plurality of circuit modules. Some or all of the modules may be selected based on an actual requirement to implement the objectives of the solutions of this application.

In this application, unless otherwise specified and limited, the terms such as "mount", "link", "connect", "fasten", and "dispose" should be understood broadly. For example, the term "connect" may be a fixed connection, may be a detachable connection, or may be integration; may be a mechanical connection or may be an electrical connection; or may be a direct connection, may be an indirect connection implemented by using an intermediate medium, or may be communication inside two elements or an interaction relationship between two elements. One of ordinary skilled in the art may interpret meanings of the foregoing terms in this application according to cases.

Automobiles are constantly developed and innovated in the tide of electrification, networking, intelligence, and sharing. FIG. 1 is a schematic diagram of functions of a vehicle 100 according to an embodiment of this application. The vehicle 100 may be configured to be in a full or partial autonomous driving mode. For example, the vehicle 100 may obtain ambient environment information of the vehicle 100 by using a perception system 120, and obtain an autonomous driving policy based on analysis of the ambient environment information, to implement full autonomous driving; or the vehicle 100 may present an analysis result to a user, to implement partial autonomous driving.

The vehicle 100 may include various subsystems, such as an information entertainment system 110, a perception system 120, a decision control system 130, a drive system 140, and a computing platform 150. In an embodiment, the vehicle 100 may include more or fewer subsystems, and each subsystem may include a plurality of components. In addition, each subsystem and component of the vehicle 100 may be connected to each other in a wired or wireless manner.

In some embodiments, the information entertainment system 110 may include a communication system 1101, an entertainment system 112, and a navigation system 113.

The communication system 1101 may include a wireless communication system, and the wireless communication system may wirelessly communicate with one or more devices directly or by using a communication network. For example, the wireless communication system may use a third-generation (3G) cellular communication technology, for example, code division multiple access (CDMA), a fourth-generation (4G) cellular communication technology, for example, a long term evolution (LTE) communication technology, or a fifth-generation (5G) cellular communication technology, for example, a new radio (NR) communication technology. The wireless communication system may communicate with a wireless local area network (WLAN) by using Wi-Fi. In some embodiments, the wireless communication system may directly communicate with a device by using an infrared link, Bluetooth®, or ZigBee®, or use other wireless protocols, such as various vehicle communication systems. The wireless communication system may include one or more dedicated short range communications (DSRC) devices, which may include public and/or private data communication between vehicles and/or roadside stations.

The entertainment system 112 may include a central control panel, a microphone, and a sounder. A user may listen to broadcast, play music, play games, and the like in the vehicle based on the entertainment system. Alternatively, the mobile phone is connected to the vehicle, and projection of the mobile phone is implemented on the central control panel. The central control panel may be of a touch type, and the user may perform an operation by touching the screen. In some cases, a voice signal of the user may be obtained by using the microphone, and some control performed by the user on the vehicle 100 is implemented based on analysis of the voice signal of the user, for example, a temperature inside the vehicle is adjusted.

The navigation system 113 may access a map service provided by a map provider, and may be used in cooperation with a global positioning system 121 and an inertia measurement unit 122 of the vehicle, to provide services such as positioning and navigation for the vehicle 100. The map service provided by the map provider may be a two-dimensional map or a high-precision map.

The decision control system 130 includes a computing system 131 that performs analysis and decision making based on information obtained by the perception system 120. The decision control system 130 further includes a vehicle control unit 132 that controls a power system of the vehicle 100, and a steering system 133, a throttle 134, and a braking system 135 that are configured to control the vehicle 100. The steering system 133 may adjust an advancement direction of the vehicle 100. For example, in an embodiment, the steering system 133 may be a steering wheel system. The throttle 134 may include an accelerator pedal of an electric vehicle, and is merely an example of a name herein. The throttle 134 is configured to control an operation speed of an engine 141 and further control a speed of the vehicle 100. The braking system 135 is configured to control the vehicle 100 to decelerate. The braking system 135 may slow down a wheel 144 by using a friction. In some embodiments, the braking system 135 may convert kinetic energy of the wheel 144 into a current. The braking system 135 may alternatively use another form to reduce a rotation speed of the wheel 144, to control the speed of the vehicle 100.

In some embodiments, the memory 152 may include instructions 153, for example, a program logic. The instructions 153 may be executed by the processor 151 to implement various functions of the vehicle 100. The memory 152 may also include additional instructions, including instructions used to send data to, receive data from, interact with, and/or control one or more of the information entertainment system 110, the perception system 120, the decision control system 130, and the drive system 140. In addition to the instructions 153, the memory 152 may further store data, such as a road map, route information, and a position, a direction, a speed, and other vehicle data of the vehicle, and other information. The information may be used by the vehicle 100 and the computing platform 150 during an operation of the vehicle 100 in autonomous, semi-autonomous, and/or manual mode.

In an embodiment, one or more of the foregoing components may be mounted separately from or associated with the vehicle 100. For example, the memory 152 may exist partially or completely separate from the vehicle 100. The foregoing components may be communicatively coupled together in a wired and/or wireless manner.

In an embodiment, the foregoing components are merely examples. During actual application, components in the foregoing modules may be added or removed based on an actual requirement. FIG. 1 should not be construed as a limitation on an embodiment of the application.

The vehicle 100 may be a car, a truck, a motorcycle, a bus, a boat, an airplane, a helicopter, a lawnmower, a recreational vehicle, a playground vehicle, a construction device, a trolley, a golf cart, a train, or the like. This is not limited in embodiments of this application.

In some embodiments, the vehicle 100 may exchange data with a cloud to implement various functions or application services of the vehicle. Data exchange may be implemented based on an existing communication standard, for example, C-V2X or LTE-V2X.

In some embodiments, the vehicle may implement an upgrade based on a software update provided by the cloud. This method may also be referred to as over the air (OTA). Based on the OTA, various aspects of the vehicle can be upgraded. For example, the information entertainment system (infotainment) of the vehicle may be upgraded by using the OTA, or an electronic control unit (ECU) of the vehicle may be upgraded by using the OTA. Vehicle performance may be upgraded by upgrading the ECU. For example, a vehicle suspension system may be adjusted by upgrading the OTA. In addition, various application services may also be provided for a vehicle owner on an on board unit through OTA upgrade.

In some embodiments, the vehicle obtains a high-precision map service based on data provided by the cloud. Considering regulatory restrictions or practical operability, for large cities or regions, a complete set of high-precision maps has a large amount of data, and it is inappropriate or impossible to store the complete set of high-precision maps on vehicles. Therefore, during driving, the vehicle obtains a high-precision map of a small region of a current position in real time, and map data is loaded in real time as required. When a high-precision map of a region is no longer required, the high-precision map of the region is released from the vehicle.

In some embodiments, security of the vehicle in a driving process may be improved by using technologies such as interaction with the cloud and vehicle-to-vehicle V2V communication. The vehicle may collect road surface information and surrounding vehicle information by using an in-vehicle sensor, and share the information with surrounding vehicles by using the cloud or V2V, so as to help an advanced driver assistance system (ADAS) of the vehicle obtain sufficient information to avoid a case such as a collision. In bad weather, the vehicle may obtain weather information and road traffic accident information by using the cloud, to help the advanced driver assistance system of the vehicle perform planning, thereby reducing a risk of a vehicle accident. For example, in rainstorm weather, the vehicle may obtain information about a road section with severe water accumulation in real time by using the cloud, to avoid the road section with severe water accumulation in a navigation planning process.

In some embodiments, the vehicle may reduce energy consumption of the vehicle by interacting with the cloud. For example, the cloud may send real-time traffic signal light information to the vehicle, and the advanced driver assistance system of the vehicle may receive status information of a traffic signal light at a front intersection in advance, and plan an appropriate and safe passing occasion and a driving speed of the vehicle at a future moment based on a current vehicle running status. In this way, not only energy consumption of the vehicle can be reduced, but also driving safety can be improved.

In some embodiments, the vehicle may obtain a schedule of the user by using the cloud, plan a driving route to a destination in advance, send the planned driving route and schedule information to the user by using the cloud, and remind the user to travel in time.

In some embodiments, the vehicle may be connected to a third party by using the cloud, to provide various services for a user. For example, with user authorization, a courier may open a trunk of the vehicle in a one-time digital authorization manner, and place an express package in the vehicle. Therefore, when the user is not present, the vehicle may receive the express package on behalf of the user.

In some embodiments, the vehicle may obtain/update an algorithm of the advanced driver assistance system by using the cloud. The algorithm is, for example, a neural network based image processing algorithm used by the perception module of the advanced driver assistance system, or a convolutional neural network (CNN) based image processing algorithm. Training of the image processing algorithm may be completed in the cloud, and is updated with update of training data. Correspondingly, the vehicle may periodically obtain an updated image processing algorithm from the cloud. Alternatively, in some embodiments, the vehicle periodically obtains parameters of the updated image processing algorithm from the cloud. In this way, the image processing algorithm of a vehicular device can be periodically updated, to improve use experience of the vehicle. The foregoing process is also applicable to update of another algorithm, for example, update of a voice processing algorithm. In a further aspect, the vehicle may also upload data obtained by the vehicle to the cloud, to provide training data for an algorithm and the like of the cloud.

With reference to the vehicle 100 and a technology of interaction between the vehicle and the cloud, this application provides a wireless charging parking space parking recommendation system and method. To better understand the technical solutions provided in this application, the following describes, with reference to embodiments, a wireless charging parking space recommendation system and method provided in embodiments of this application.

Figure 2:
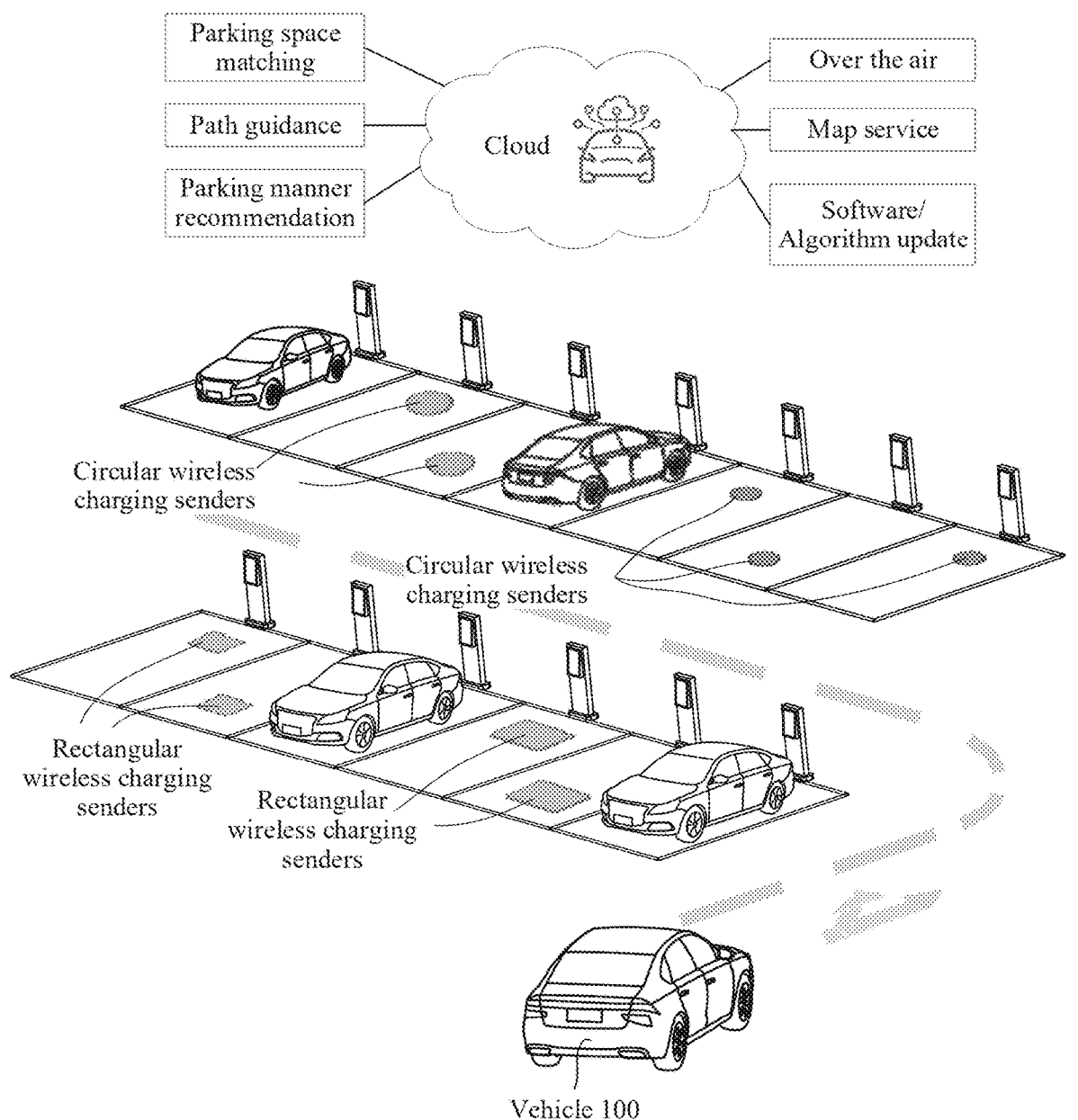
FIG. 2 is a schematic scenario diagram of parking in a wireless charging parking space of a parking lot according to an embodiment of this application.

A wireless charging parking space recommendation system and method provided in embodiments of this application may be applied to a parking scenario in a parking lot. FIG. 2 is a schematic diagram of a parking scenario in a parking lot. As shown in FIG. 2, in the parking lot, there are a plurality of parking spaces that can provide a wireless charging service.

Embodiment 1 to Embodiment 3 of this application provide a wireless charging parking space recommendation system, and Embodiment 4 of this application provides a wireless charging parking space recommendation method.

Embodiment 1 of this application provides a wireless charging parking space recommendation system. FIG. 3-*a* is a schematic diagram of a system according to an embodiment of this application. As shown in FIG. 3-*a*, the system includes a vehicular device and a parking lot server.

In Embodiment 1, as shown in FIG. 3-*a*, the parking lot server may communicate with the vehicular device. The parking lot server 200 includes a communication module 210, a storage module 220, and a control unit 230. The parking lot server 200 may receive vehicle information sent by a vehicle. After receiving the vehicle information sent by the vehicle, the parking lot server 200 may provide targeted parking space matching, optimal parking space recommendation, parking manner recommendation, parking space guidance information recommendation, and other services for the vehicle with reference to parking lot parking space information in the storage module 220, and send parking space information obtained through matching to the vehicular device 111, to guide the vehicle to travel to the target parking space and be parked into the target parking space in an appropriate manner.

It should be noted that, parking into the target parking space in an appropriate manner herein means that an appropriate parking manner is selected, for example, reverse parking or forward driving, so that after the vehicle is parked into the parking space, a wireless charging receiver of the vehicle can overlap a wireless charging sender of the parking space. Parking into the target parking space in an appropriate manner is to avoid a case in which the wireless charging receiver of the vehicle cannot overlap the wireless charging sender of the parking space due to an incorrect parking direction. When an incorrect parking direction is selected, to enable the wireless charging receiver of the vehicle to overlap the wireless charging sender of the parking space, the vehicle needs to be driven out of the parking space and be parked again. This causes a bad consequence such as passageway blockage in the parking lot, and affects parking experience of a user.

In Embodiment 1, as shown in FIG. 3-*a*, the vehicular device 111 may communicate with the parking lot server 200. The vehicular device 111 may send vehicle information to the parking lot server 200. After the parking lot server 200 completes parking space matching, the vehicular device 111 may receive guidance information sent by the parking lot server 200. The guidance information received by the vehicular device 111 may include parking space matching information, optimal parking space recommendation information, parking manner recommendation information, parking space guidance information, and the like.

It should be noted that the vehicular device 111 may be a device mounted in the vehicle, for example, a device mounted in the vehicle before the vehicle is delivered from a factory, or a device mounted in the vehicle after the vehicle is delivered from the factory. The vehicular device 111 may alternatively be another terminal device, for example, a mobile phone terminal, a tablet computer, or an intelligent wearable device.

In addition, the parking lot server 200 may be disposed in a parking lot region, or may be disposed outside the parking lot region and decoupled from a spatial position of the parking lot. In an embodiment, when the parking lot server 200 is disposed in the parking lot region, the parking lot server 200 may be a server dedicated to the parking lot. In an embodiment, when the parking lot server 200 is decoupled from the spatial position of the parking lot, the server may be a cloud server. If a difference between the two is not emphasized, the two are collectively referred to as the parking lot server 200 in this specification of this application.

For example, in an embodiment, when the vehicular device 111 is a mobile phone terminal, the user may enter vehicle information on the mobile phone terminal. For example, the user enters vehicle model information on the mobile phone terminal, or the user enters vehicle license plate number information on the mobile phone terminal, and the mobile phone terminal finds, through query, vehicle information such as a vehicle size and a charging receiver position in a local database or a cloud database based on information such as the vehicle model information or the license plate number, and the mobile phone terminal sends the vehicle information to the parking lot server. The parking lot server 200 receives the vehicle information sent by the mobile phone terminal, and sends parking space recommendation and guidance information to the mobile phone terminal after completing parking space matching. The mobile phone terminal receives the parking space recommendation and guidance information sent by the parking lot server 200. The parking space recommendation and guidance information received by the mobile phone terminal may include parking space matching information, optimal parking space recommendation information, parking manner recommendation information, parking space guidance information, and the like. Finally, the guidance information is presented to the user by using the mobile phone terminal, and the user may further complete parking decision making based on the guidance information. When there is a wireless charging parking space that meets a parking requirement of the vehicle, the user may drive, based on the parking space guidance information received by the mobile phone terminal, to a place near the parking space in a shortest path, and choose, based on the parking manner recommendation information received by the mobile phone terminal, to park into the target parking space in a reverse parking manner or a forward parking manner, so that the wireless charging receiver of the vehicle overlaps the wireless charging sender of the parking space.

In addition, it should be noted that parking space matching calculation may also be implemented in another manner. For example, the parking lot server 200 provides only parking space information but does not provide a parking space matching service, and a parking space matching calculation process is completed by the vehicular device or the mobile phone terminal. For another example, the parking space matching calculation process is completed by the vehicular device or the mobile phone terminal, and the vehicular device or the mobile phone terminal uses a cloud service in a process of completing matching calculation, and the cloud service may be provided by a cloud server outside the parking lot server 200.

Embodiment 2 of this application provides a wireless charging parking space recommendation system. FIG. 3-*b* is a schematic diagram of a wireless charging parking space recommendation system according to Embodiment 2 of this application.

In Embodiment 2, as shown in FIG. 3-*b*, the wireless charging parking space recommendation system provided in Embodiment 2 of this application may include a vehicular device 111, a parking lot server 200, and a parking space sensor 300.

The vehicular device 111 may include a communication module 1111, a storage module 1112, and an output module 1113. The parking lot server 200 may include a parking lot communication module 210, a parking space information storage module 220, and a parking space matching controller 230. The parking space sensor 300 may include a charging power module 310 and a vehicle perception module 320.

The wireless charging parking space recommendation system or method provided in Embodiment 2 of this application may be applied to a parking scenario of an electric vehicle in a parking lot.

In an embodiment, as shown in FIG. 3-*b*, when entering the parking lot, a vehicle sends size information of the vehicle to the parking lot server 200 by using the in-vehicle communication module 1111. The parking lot service controller 230 obtains parking space information by using the storage module 220 or the parking space sensor 300. The parking lot server determines, with reference to the vehicle information and the parking space information, whether there is a wireless charging parking space that matches a charging requirement of the vehicle, and recommends a target parking space and a parking manner that are obtained through matching to the vehicular device 111. Finally, the vehicular device 111 presents, to the user by using the output module 1113, guidance information sent by the server.

In an embodiment, as shown in FIG. 3-*b*, the parking lot server 200 may communicate with a sensor in each parking space. The parking lot server 200 may obtain information such as an idle status of a parking space, a wireless charging status of the parking space, a size of the parking space, and a position of the parking space by using the parking space sensor 300, and update the information in real time. The vehicular device 111 of the electric vehicle may establish an information connection to the parking lot server 200 by using a mobile network after the vehicle enters the parking lot, to send or receive information to or from the parking lot server 200. According to the wireless charging parking space recommendation system or method provided in an embodiment of the application, the vehicle can quickly obtain, in the parking lot, information such as a path to the target charging parking space and a parking manner, so that the vehicle can quickly arrive at the target parking space, and a good effect such as efficient wireless charging can be successfully implemented by parking the vehicle once.

Embodiment 3 of this application provides a wireless charging parking space recommendation system. FIG. 3-*c* is a schematic diagram of a wireless charging parking space recommendation system according to Embodiment 3 of this application.

As shown in FIG. 3-*c*, the wireless charging parking space recommendation system provided in Embodiment 3 of this application may include a vehicle 100, a parking lot server 200, and a parking space sensor 300.

In Embodiment 3, as shown in FIG. 3-*c*, the vehicle 100 may include a communication system 1101, a storage module 152, and a navigation system 113. The parking lot server 200 may include a parking lot communication module 210, a parking space information storage module 220, and a parking space matching controller 230. The parking space sensor 300 may include a charging power module 310 and a vehicle perception module 320.

As shown in FIG. 3-*c*, when the vehicle enters a parking lot, the vehicle 100 sends size information of the vehicle to the parking lot server 200 by using the communication system 1101. The parking lot service controller 230 obtains parking space information by using the storage module 220 or the parking space sensor 300. The parking lot server determines, with reference to the vehicle information and the parking space information, whether there is a wireless charging parking space that matches a charging requirement of the vehicle, and recommends a target parking space and a parking manner that are obtained through matching to the vehicle 100. Finally, the vehicle 100 presents, to the user by using the navigation system 113, guidance information sent by the server, and the user may park the vehicle based on parking space navigation information provided by the navigation system 113. For example, the navigation system 113 presents an appropriate parking space to the user for selection, and provides recommendation information of an optimal parking space. In addition, when the vehicle travels to a place near the parking space, the navigation system 113 further provides recommendation information of a parking manner, to guide the user to select an appropriate manner to park the vehicle into the parking space. The parking manner may be one of forward parking, reverse parking, and the like. By selecting an appropriate parking manner, a case in which the wireless charging receiver of the vehicle cannot overlap the wireless charging sender of the parking space due to an incorrect parking direction can be avoided. When an incorrect parking direction is selected, to enable the wireless charging receiver of the vehicle to overlap the wireless charging sender of the parking space, the vehicle needs to be driven out of the parking space and be parked again. This causes a bad consequence such as passageway blockage in the parking lot, and affects parking experience of a user.

It should be noted that the foregoing examples are merely used to describe implementation principles of the solutions of this application, and increase diversity of implementations, but are not intended to limit the implementations of this application. For more other possible implementations, details are not described again in this application.

Figure 4:
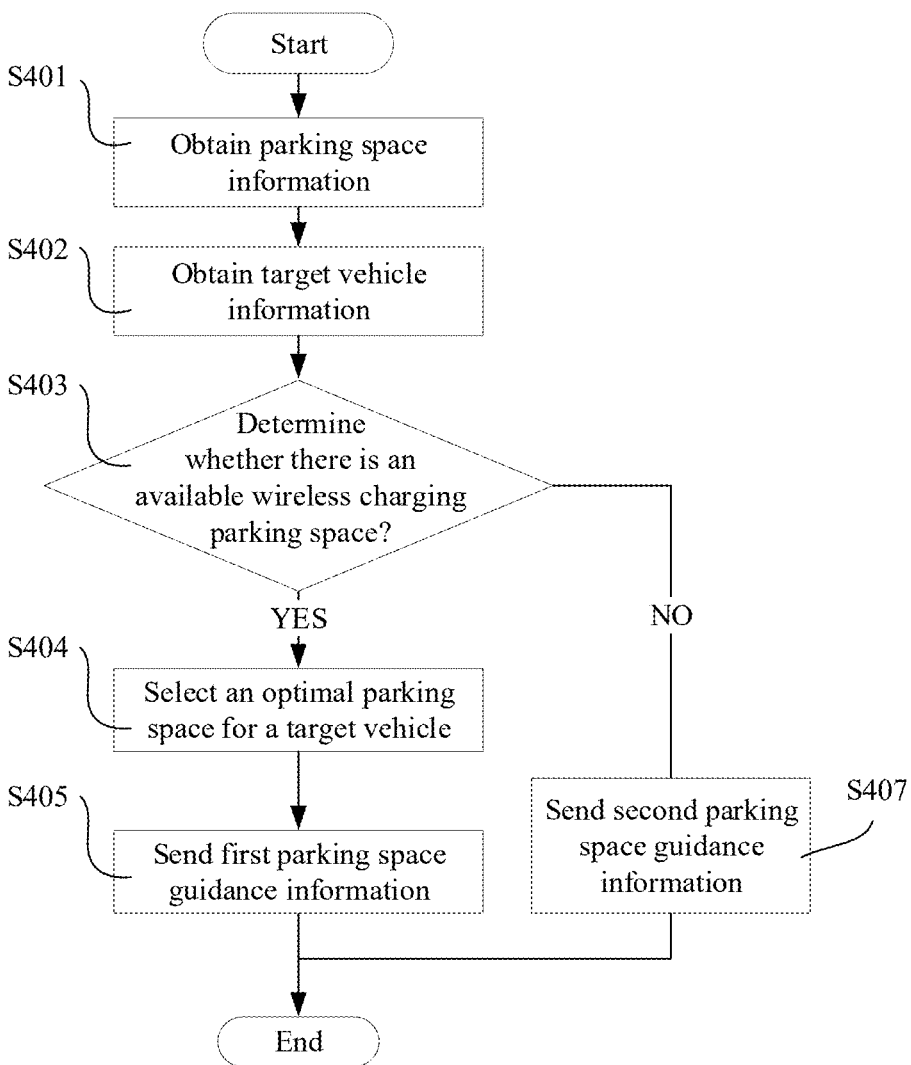
FIG. 4 is a schematic flowchart of a parking recommendation method according to an embodiment of this application.

Embodiment 4 of this application provides a wireless charging parking space recommendation method. FIG. 4 is a schematic flowchart of a wireless charging parking space recommendation method according to Embodiment 4 of this application. With reference to Embodiment 4, the following describes in detail a wireless charging parking space recommendation method provided in this application.

As shown in FIG. 4, a wireless charging parking space recommendation method provided in an embodiment of the application includes the following operations.

S401: Obtain parking space information.

Operation S401 may be performed by a parking lot server.

In the wireless charging parking space recommendation method provided in an embodiment of the application, the parking space information may include information such as idle status information of a parking space, a size of a wireless charging sender of the parking space, and a position of the wireless charging sender of the parking space in the parking space.

First, with reference to an embodiment, obtaining of the idle status information of the parking space is described.

In an embodiment, the parking lot server 200 may obtain the idle status information of the parking space of a parking lot by using a parking space sensor 300. For example, a vehicle perception module 320 perceives whether a vehicle has been parked in the current parking space. The parking lot server 200 obtains a perception result of the vehicle perception module 320, and stores the obtained idle status information of the parking space of the parking lot into a storage module 220. The parking lot server 200 may further obtain latest idle status information of the parking space in real time and store the latest idle status information of the parking space into the storage module 220.

It should be noted that, the vehicle perception module 320 in the parking space sensor 300 may perceive whether a vehicle has been parked in the current parking space, and obtain the idle status information of the parking space. The idle status information of the parking space may be "idle" or "occupied". When the idle status of the parking space is "idle", no vehicle is parked in the parking space. When the idle status of the parking space is "occupied", a vehicle is parked in the parking space. In addition, a charging power module 310 of the parking space sensor 300 may further send a use status of a parking space charging function to the parking lot server 200, for example, a vehicle in the current parking space is using a charging service; for another example, no vehicle in the current parking space is using the charging service; or a charging progress of a vehicle in the current parking space and a time from a current moment to a moment at which charging is completed. In an embodiment, the charging power module 310 may further feed back a health status of a parking space charging device to the parking lot server 200, for example, the charging device in the current parking space is faulty and cannot provide a charging service; and for another example, the charging device in the current parking space is healthy and can provide a charging service. When the parking lot server 200 receives information indicating that the charging device in a first parking space is faulty, the information may be marked when parking space guidance information is provided. For example, that the first parking space including the faulty charging device is in an "idle" state, but the first parking space "cannot provide a charging service" is marked in the information. When the parking lot server 200 receives the information indicating that the charging device in the first parking space is faulty, information about the first parking space may alternatively be eliminated from recommendation information, and only information about a parking space that is obtained through matching calculation and whose charging device is in a healthy state is provided.

It should be noted herein that the idle status information of the parking space may be expressed in a plurality of other forms, for example, "available" and "parkable" that have a similar meaning to "idle", or "busy", "unavailable", and "in use" that are substantially the same as "occupied". An expression form is not limited in this application.

In addition, it should be noted that the parking lot parking space information stored in the storage module 220 of the parking lot server 200 may be updated by using a plurality of update frequencies. A update frequency or update policy is not limited in an embodiment of the application. For example, a manner of updating the idle status information of the parking space in the parking lot may be: updating the idle status of the parking space at a fixed interval, or updating the idle status of the parking space when the idle status of the parking space changes.

In an embodiment, the parking lot server 200 may use an update manner of a fixed time interval. In an embodiment, the server queries the parking space sensor 300 at a first time interval for the idle status that is of the parking space in the parking lot and that is sensed by the vehicle perception module 320, and records the idle status into the storage module 220.

In an embodiment, the parking lot server 200 may update the parking space status information when the parking space idle status changes. In an embodiment, when the parking lot server 200 perceives, by using the vehicle perception module 320, that the parking space status changes from "idle" to "occupied" or the parking space status changes from "occupied" to "idle", the parking lot server 200 records latest status information of the parking space into the storage module 220. For example, after a first vehicle is parked into the first parking space, the vehicle perception module 320 perceives that the status of the first parking space changes from "idle" to "occupied". The parking lot server 200 updates the idle status of the first parking space to "occupied". After the first vehicle is driven out of the first parking space, the vehicle perception module 320 perceives that the idle status of the first parking space changes from "occupied" to "idle", and the parking lot server 200 updates the idle status of the first parking space to "idle".

The following describes size and position information of the wireless charging sender of the parking space with reference to the accompanying drawings.

In an embodiment, the parking lot server 200 pre-stores a map of the parking lot and position information and size information of each parking space. The position information of the parking space may be used to locate each parking space in the parking lot. The size information of the parking space may include a first parking space length $l_{P1}$ and a second parking space length $l_{P2}$ of the parking space. In an embodiment, the size information of the parking space may further include a length of a long side and a length of a short side of the parking space.

FIG. 5 is a schematic diagram of size information of a parking space. As shown in FIG. 5, the first parking space length $l_{P1}$ is the larger length of a third parking space length $l_{P3}$ and a fourth parking space length $l_{P4}$. The second parking space length $l_{P2}$ is the smaller length in the third parking space length $l_{P3}$ and the fourth parking space length $l_{P4}$. The third parking space length $l_{P3}$ is a longitudinal distance from a center of the wireless charging sender of the first parking space to a first short side of the first parking space. The fourth parking space length $l_{P4}$ is a longitudinal distance from the center of the wireless charging sender of the first parking space to a second short side of the first parking space.

In an embodiment, the first short side is a side that is of the first parking space and that does not allow the first vehicle to enter; and the second short side is a side that is of the first parking space and that allows the first vehicle to enter. For example, considering an actual form of the parking space in the parking lot, an obstacle such as a wall, a fence, or a vehicle ground surface limiting block may be disposed near the first short side of the parking space, and the first vehicle cannot be parked into the parking space through the first short side. There is no obstacle near the second short side of the parking space, and the first vehicle may be parked into the parking space through the second short side.

It should be noted that, in the wireless charging parking space recommendation method provided in an embodiment of the application, a longitudinal position of a wireless charging apparatus in the parking space relative to the parking space may be described by using the third parking space length $l_{P3}$ and the fourth parking space length $l_{P4}$. In an embodiment, a shape of the parking space is a rectangle, and the parking space includes two equal long sides and two equal short sides. A direction of a straight line connecting a middle point of the first short side and a middle point of the second short side of the parking space is a longitudinal direction of the parking space. The first short side and the second short side of the parking space are used as borders, and a center line in the longitudinal direction of the parking space is used as a boundary. When the third parking space length $l_{P3}$ of the first parking space is greater than the fourth parking space length $l_{P4}$, the wireless charging apparatus of the parking space is located on one side that is away from the first short side and close to the second short side of the parking space. When the third parking space length $l_{P3}$ is equal to the fourth parking space length $l_{P4}$ of the first parking space, a center of the wireless charging apparatus of the parking space is located on the center line of the longitudinal direction of the parking space. When the third parking space length $l_{P3}$ is less than the fourth parking space length $l_{P4}$ of the first parking space, the wireless charging apparatus of the parking space is located on one side that is away from the second short side and close to the first short side of the parking space.

In the wireless charging parking space recommendation method provided in an embodiment of the application, the size information of the parking space further includes shape and size information of the wireless sender. As shown in FIG. 5, when a transmit cross section of the wireless sender is a circle, the size information of the sender includes a first sender radius $R_1$, and an area of a first sender may be obtained through calculation with reference to the first sender radius $R_1$. When the transmit cross section of the wireless sender is a rectangle, the size information of the sender includes a first sender length $A_1$ and a second sender length $B_1$, and the area of the first sender may be obtained through calculation with reference to the first sender length $A_1$ and the second sender length $B_1$. When the cross section of the sender is in another shape, similarly, the parking space size information also includes another type of sender shape and size information, and the area of the sender may be obtained through calculation with reference to the size information of the sender. Details are not described in an embodiment of the application.

S402: Obtain vehicle information.

Operation S402 may be performed by the parking lot server. In an embodiment, the parking lot server may receive first vehicle information of the first vehicle.

FIG. 6 is a schematic diagram of size information of the first vehicle. As shown in FIG. 6, the first vehicle information includes a first vehicle length $L_{C1}$ and a second vehicle length $l_{C2}$. The first vehicle length $l_{C1}$ is the larger length of a third vehicle length $l_{C3}$ and a fourth vehicle length $l_{C4}$. The second vehicle length $l_{C2}$ is the smaller length in the third vehicle length $l_{C3}$ and the fourth vehicle length $l_{C4}$. The third vehicle length $l_{C3}$ is a longitudinal distance from a center of the wireless charging receiver of the first vehicle to a head of the first vehicle. The fourth vehicle length $l_{C4}$ is a longitudinal distance from the center of the wireless charging receiver of the first vehicle to a rear of the first vehicle.

In the wireless charging parking space recommendation method provided in an embodiment of the application, the first vehicle information further includes shape and size information of a cross section of the wireless charging receiver. When a receive cross section of the wireless receiver is a circle, the size information of the receiver includes a first receiver radius $R_2$, and an area of the first receiver may be obtained through calculation with reference to the first receiver radius $R_2$. When the receive cross section of the wireless receiver is a rectangle, the size information of the receiver includes a first receiver length $A_2$ and a second receiver length $B_2$, and the area of the first receiver may be obtained through calculation with reference to the first receiver length $A_2$ and the second receiver length $B_2$. When the cross section of the receiver is in another shape, similarly, the parking space size information also includes another type of receiver shape and size information, and the area of the receiver may be obtained through calculation with reference to the size information of the receiver. Details are not described in an embodiment of the application.

It should be noted that the first vehicle information of the first vehicle may be obtained in a plurality of manners. A manner of obtaining the first vehicle information is not limited in this application. For example, the first vehicle information of the first vehicle may be obtained by using original information stored in a vehicular device or the vehicle itself; or the first vehicle information of the first vehicle may be obtained by querying by using the vehicular device or a mobile phone terminal based on vehicle model information; or the first vehicle information may be obtained by querying in a cloud or a local vehicle model library based on the vehicle model information after the parking lot server receives the vehicle model information. The following describes different obtaining manners in detail.

In an embodiment, the first vehicle information of the first vehicle may be obtained by using a vehicle terminal. The vehicle terminal carried on the first vehicle stores the first vehicle information. When the first vehicle enters the parking lot, the vehicle terminal of the first vehicle sends the first vehicle information to the parking lot server, and the parking lot server obtains the first vehicle information.

In an embodiment, the first vehicle information of the first vehicle may be obtained by using a mobile terminal. For example, after license plate information of the first vehicle is recorded by using the mobile terminal (for example, a mobile phone), the mobile terminal (for example, the mobile phone) sends the license plate information of the first vehicle to the parking lot server. The parking lot server receives the license plate information of the first vehicle, and obtains the first vehicle information of the first vehicle through database matching. In an embodiment, the database may be a cloud database. In an embodiment, the database may be a local database of the parking lot server, and the local database stores the first vehicle information corresponding to the license plate information of the first vehicle.

In an embodiment, after the vehicle model information of the first vehicle is recorded by using the mobile terminal (for example, the mobile phone), the mobile terminal (for example, the mobile phone) may send the vehicle model information of the first vehicle to the parking lot server. The parking lot server receives the vehicle model information of the first vehicle, and obtains the first vehicle information of the first vehicle through database matching. In an embodiment, the database may be a cloud database. In an embodiment, the database may be a local database of the parking lot server, and the local database stores first vehicle information corresponding to various vehicle model information.

In an embodiment, the vehicle information of the first vehicle may be obtained by using a recognition system of the parking lot. In an embodiment, when the first vehicle enters the parking lot, a camera system of the parking lot recognizes license plate information of the first vehicle, and obtains, by using the server, vehicle information corresponding to the license plate information. It should be noted that the license plate information may include a new energy vehicle identifier and license plate number information. In an embodiment, when the first vehicle enters the parking lot, the camera recognition system of the parking lot recognizes a vehicle model of the first vehicle, and obtains vehicle information of the first vehicle by querying the database.

It should be noted that, in the wireless charging parking space recommendation method provided in an embodiment of the application, a sequence of operation S401 and operation S402 is not limited. Operation S402 may be set before operation S401. In the wireless charging parking space recommendation method provided in an embodiment of the application, a sequence of obtaining the vehicle information and obtaining the parking space information is not limited. The obtaining of the parking space information may be set before the obtaining of the vehicle information. The "obtaining" described herein may be obtaining, by a calculation unit, information from a storage unit, or may be obtaining information from a sensor, a terminal, and the like. For example, when the storage module 220 of the server has stored the vehicle information or the parking space information, the server may directly read the first vehicle information and the parking space information from the storage module 220, and perform subsequent parking space matching calculation.

S403: Determine whether a wireless charging parking space that meets a matching condition exists.

Operation S403 may be performed by the parking lot server.

Figure 7:
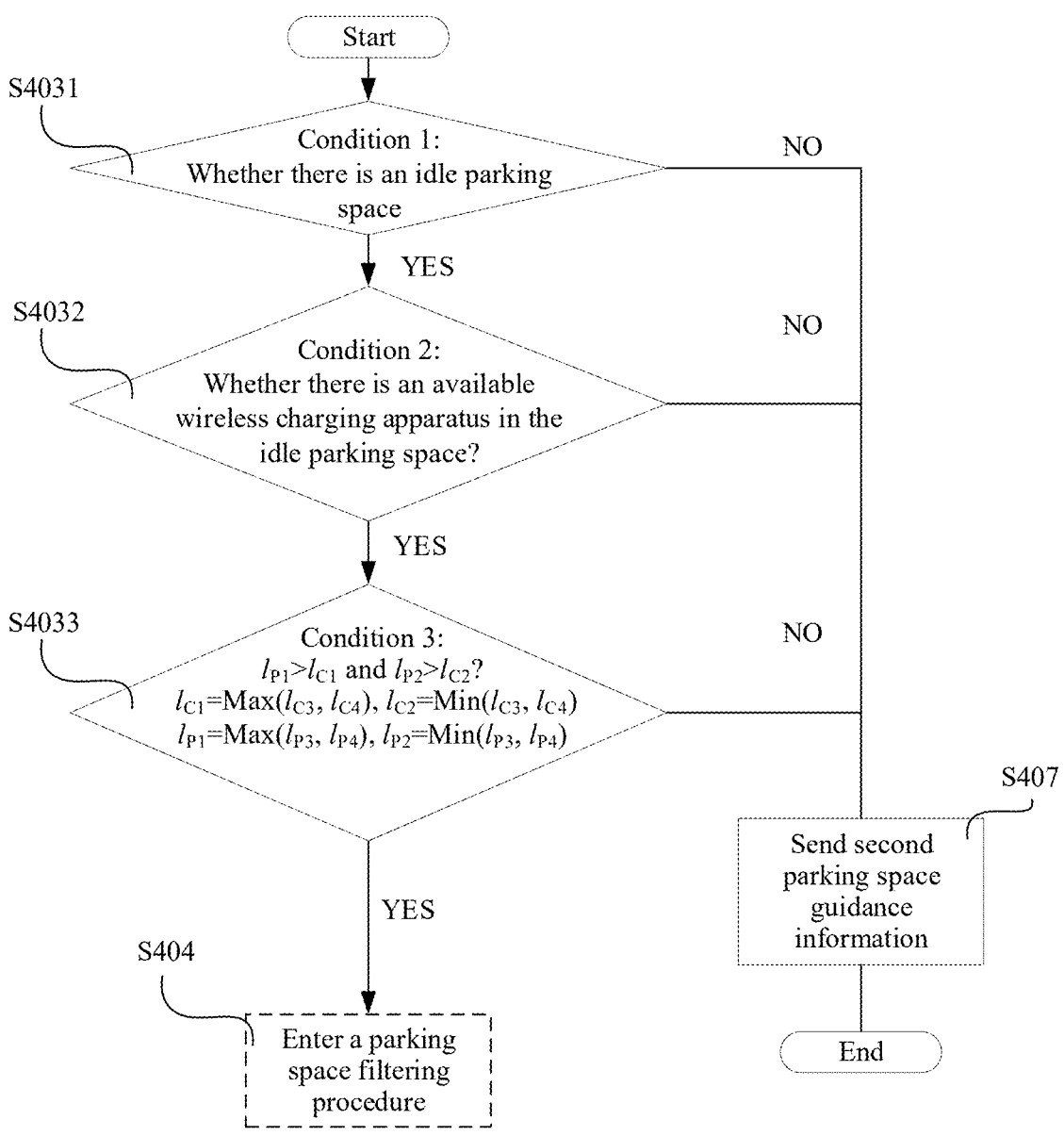
FIG. 7 is a schematic flowchart of determining a vacant wireless charging parking space according to an embodiment of this application.

FIG. 7 is a schematic flowchart of determining whether there is an available wireless charging parking space. In an embodiment, the parking lot server determines, with reference to the parking space information and the vehicle information by using the parking space matching condition, whether the wireless charging parking space that meets a parking condition of the first vehicle exists.

After the first vehicle that needs to be wirelessly charged enters the parking lot, an information connection to the server is established by using a wireless network. After establishing the connection to the server, the vehicular device sends information about the vehicle to the server. The server may determine, based on three conditions, whether there is an available wireless charging parking space.

S4031: Determine whether there is an idle parking space. If there is no idle parking space, proceed to S407, and the server may notify the vehicular device that there is no idle parking space. If there is an idle parking space, proceed to S4032.

S4032: Determine whether there is an available wireless charging apparatus in each idle parking space.

If there is no available wireless charging and power supply apparatus in all idle parking spaces, proceed to S407, and the server may notify the vehicular device that there is no available charging parking space. If there is an available wireless charging apparatus in an idle parking space, proceed to S4033.

S4033: Determine, with reference to the parking space information and the vehicle information by using the parking space matching condition, whether the head and the rear of the vehicle exceed the short side of the parking space when the center of the charging receiver of the vehicle directly faces the center of the ground charging sender. If the parking space matching condition is not met, the vehicle cannot complete center-facing charging within a parking space range, and proceed to S407, and the server may notify the vehicular device that there is no available charging parking space. If the parking space matching condition is met, proceed to S404 to further filter parking spaces that meet the condition.

The vehicle information in S4033 may include the first vehicle length $l_{C1}$ and the second vehicle length $l_{C2}$ of the first vehicle. The first vehicle length $l_{C1}$ is the larger length of the third vehicle length $l_{C3}$ and the fourth vehicle length $l_{C4}$. The second vehicle length $l_{C2}$ is the smaller length in the third vehicle length $l_{C3}$ and the fourth vehicle length $l_{C4}$. The third vehicle length $l_{C3}$ is the longitudinal distance from the center of the wireless charging receiver of the first vehicle to the head of the first vehicle. The fourth vehicle length $l_{C4}$ is the longitudinal distance from the center of the wireless charging receiver of the first vehicle to the rear of the first vehicle.

The parking space information in S4033 may include the first parking space length $l_{P1}$ and the second parking space length $l_{P2}$ of the first parking space. The first parking space length $l_{P1}$ is the larger length of the third parking space length $l_{P3}$ and the fourth parking space length $l_{P4}$. The second parking space length $l_{P2}$ is the smaller length in the third parking space length $l_{P3}$ and the fourth parking space length $l_{P4}$. The third parking space length $l_{P3}$ is the longitudinal distance from the center of the wireless charging sender of the first parking space to the first short side of the first parking space. The fourth parking space length $l_{P4}$ is the longitudinal distance from the center of the wireless charging sender of the first parking space to the second short side of the first parking space.

The parking space matching condition in S4033 may be: The first parking space length $l_{P1}$ is greater than the first vehicle length $l_{C1}$, and the second parking space length $l_{P2}$ is greater than the second vehicle length $l_{C2}$, that is, $(l_{P1} > l_{C1})$ and $(l_{P2} > l_{C2})$. The matching condition herein is set to ensure that when the center of the wireless charging receiver of the first vehicle directly faces the center of the wireless charging sender of the parking space, neither the head nor the rear of the first vehicle exceeds a range of the parking space.

It should be noted that, when a total length of the parking space is greater than a total length of the vehicle but does not meet the parking space matching condition, although the parking space can meet a parking requirement of the first vehicle, the parking space cannot meet a requirement of the vehicle for efficient wireless charging. This is because when the parking space matching condition is not met, the parking space cannot meet the requirement that the center of the wireless charging receiver of the vehicle directly faces the center of the wireless charging sender of the parking space on the premise that it is ensured that neither the head nor the rear of the vehicle exceeds the parking space. This results in adverse consequences such as a decrease in wireless charging efficiency and overheating. Therefore, for a parking space that cannot meet the parking space matching condition, in the wireless charging parking space recommendation method provided in an embodiment of the application, the parking space is not recommended as a parking space that can provide a wireless charging function.

In an embodiment, when a candidate parking space meets the parking space matching condition for the first vehicle, the parking lot server 200 sends first parking guidance information to the vehicular device 111. The first parking guidance information may include notifying the vehicle that an available wireless charging parking space that is, a target parking space, exists. In addition, the first parking guidance information may further include parking path guidance information of the target parking space, to guide the vehicle to travel along an optimal path, for example, a path with a shortest distance or a shortest time, to the target parking space. When the candidate parking space does not meet the matching condition for the first vehicle, second parking guidance information is output. The second parking guidance information includes notifying a user that there is no available wireless charging parking space.

In conclusion, it can be learned that, in an embodiment provided in an embodiment, the parking lot server 200 obtains the first vehicle information of the first vehicle, and determines, with reference to the parking space information, whether the parking space meets the parking space matching condition of the first vehicle. If the parking space meets the parking space matching condition of the first vehicle, in an embodiment, the server sends the first parking guidance information to the terminal, where the first parking guidance information includes notifying the vehicular device 111 that an available wireless charging parking space exists and position information of the parking space; or if the parking space does not meet the parking space matching condition of the first vehicle, the server sends the second parking guidance information to the terminal. The second parking guidance information includes notifying the vehicle that in the current parking lot, there is no wireless charging parking space that meets the parking condition of the vehicle.

In an embodiment, the server sends the first parking guidance information to the terminal after performing parking space preferential selection calculation or parking manner calculation. The first parking guidance information includes optimal parking space recommendation information and parking manner recommendation information. In an embodiment, when the candidate parking space meets the matching condition for the first vehicle, parking space information that meets the matching condition is output. The parking space information may include information such as the first parking space length of the parking space, the second parking space length of the parking space, and a shape and a size of the wireless charging sender of the parking space, for subsequent parking space filtering.

S404: Select a most appropriate candidate parking space.

Operation S404 may be performed by the parking lot server. After operation S403, in an embodiment, the parking lot server may further filter parking space matching results obtained in operation S403, to obtain wireless charging parking space recommendation information that is more suitable for the first vehicle.

FIG. 8-$a$ is a schematic flowchart of selecting an optimal parking space. As shown in FIG. 8, in the wireless charging parking space recommendation method provided in an embodiment of this application, a parking space preferential selection process may include: calculating a first area $S_1$ of each candidate parking space, and selecting a candidate parking space with a largest first area $S_1$ as an optimal candidate parking space. The first area $S_1$ is an area of an overlapping part between projections of an area $S_r$ of the receiver of the vehicle and an area $S_s$ of the sender of the parking space on the ground when the center of the receiver of the vehicle overlaps the center of the sender of the candidate parking space.

The area $S_s$ of the wireless charging sender of the parking space is an area of a projection of the wireless charging sender of the parking space in a plane of the parking space, and may be obtained through calculation based on the shape and the size of the wireless charging sender of the parking space. For example, as shown in FIG. 5, when a shape of the projection of the wireless charging sender of the parking space in the plane of the parking space is a circle and a radius is $R_1$, the area of the sender of the parking space is $S_s=\pi R_1^2$. For another example, when the shape of the projection of the wireless charging sender of the parking space in the plane of the parking space is a rectangle, and distances from a geometric center to the short side and the long side are $A_1$ and $B_1$ respectively, the area of the wireless charging sender of the parking space is $S_s=4A_1B_1$. The area $S_r$ of the wireless charging receiver of the vehicle is an area of a projection of the wireless charging receiver of the vehicle in the plane of the parking space, and may be obtained through calculation with reference to the shape and the size of the wireless charging receiver of the vehicle. For example, as shown in FIG. 6, when a shape of the projection of the wireless charging receiver of the vehicle in the plane of the parking space is a circle and a radius is $R_2$, the area of the receiver of the vehicle is $S_r=\pi R_2^2$. For another example, when the shape of the projection of the wireless charging receiver of the vehicle in the plane of the parking space is a rectangle, and distances from a geometric center to the short side and the long side are $A_2$ and $B_2$ respectively, the area of the wireless charging receiver of the vehicle is $S_r=4A_2B_2$.

In the parking lot, a largest area of first areas $S_1$ of different parking spaces is a largest first area $S_{1max}$. Because wireless charging efficiency of the vehicle is positively correlated with the first area $S_1$, selecting a parking space with the largest first area $S_{1max}$ for wireless charging of the vehicle helps improve charging efficiency of the wireless charging receiver of the vehicle.

It should be noted that, in an actual parking lot scenario, there may be a plurality of parking spaces with a same first area $S_1$ that is the largest first area $S_{1max}$.

In an embodiment, these parking spaces with the same first area $S_1$ that is the largest first area $S_{1max}$ may have a same size and a same charging apparatus. When there are more than one parking space that meets the parking requirement of the vehicle and that is in an idle state in these parking spaces, because spatial positions of candidate parking spaces are different, paths from an entrance of the parking lot to the candidate parking spaces are also different. Therefore, a more appropriate parking space may be provided for the vehicle through further filtering, to shorten a driving path or reduce a time consumed in a process of driving the vehicle to the parking space.

In an embodiment, these parking spaces with the same first area $S_1$ that is the largest first area $S_{1max}$ may have different sizes or different charging apparatuses. When there are more than one parking space that meets the parking requirement of the vehicle and that is in an idle state in these parking spaces, because the candidate parking spaces differ in aspects of sizes, charging apparatuses, or the like, there is also a possibility of further filtering.

Therefore, in the wireless charging parking space recommendation method provided in an embodiment of the application, the parking space preferential selection algorithm may further include filtering a plurality of parking spaces with the largest first area $S_{1max}$.

In an embodiment, as shown in FIG. 8-a, when there is one parking space with the largest first area $S_{1max}$, the parking space with the largest first area $S_{1max}$ is selected as the optimal candidate parking space. When there are more than one candidate parking space with the largest first area $S_{1max}$, the parking space preferential selection algorithm may further include: calculating, with reference to the first vehicle information, first evaluation indicators $I_1$ of all candidate parking spaces with the largest first area $S_{1max}$. A candidate parking space with an optimal first evaluation indicator $I_1$ is selected as the optimal candidate parking space. It should be noted that, in an embodiment, a quantity of candidate parking spaces with the largest first area $S_{1max}$ needs to be determined.

In an embodiment, after the candidate parking spaces with the largest first area $S_{1max}$ are obtained, the parking space preferential selection algorithm may further include: calculating, with reference to the first vehicle information, first evaluation indicators of all the candidate parking spaces with the largest first area $S_{1max}$. The candidate parking space with the optimal first evaluation indicator is selected as the optimal candidate parking space. It should be noted that, in an embodiment, the quantity of the candidate parking spaces with the largest first area $S_{1max}$ does not need to be determined, and a determining operation can be omitted. However, in an embodiment, when there is one parking space with the largest first area $S_{1max}$, the first evaluation indicator also needs to be calculated and filtered for the parking space with the largest first area $S_{1max}$.

It should be noted that the first evaluation indicator $I_1$ may include a plurality of evaluation factors.

In an embodiment, the first evaluation indicator $I_1$ may include a second area $S_2$. The second area $S_2$ is a difference between the area $S_s$ of the first sender and the first area $S_1$ of each candidate parking space, that is, an area in which the charging sender is not covered by the charging receiver when the center of the charging sender directly faces the center of the charging receiver. In a wireless charging process of the vehicle, energy generated by a redundant charging area of the charging sender of the parking space is not received by the receiver of the vehicle, causing a waste of energy. The second area $S_2$ may reflect, to some extent, a size of the redundant sender area that is of the wireless charging sender and that does not contribute to wireless charging of the vehicle. Therefore, matching a parking space with a small second area $S_2$ for the vehicle helps reduce a waste of energy.

In an embodiment, the first evaluation indicator $I_1$ may include a first distance $l_1$ and a second distance $l_2$. The first distance $l_1$ is a difference between the first parking space length $l_{P1}$ and the first vehicle length $l_{C1}$. The second distance $l_2$ is a difference between the second parking space length $l_{P2}$ and the second vehicle length $l_{C2}$. When the center of the wireless charging receiver of the vehicle overlaps the center of the wireless charging sender of the parking space, the first distance $l_1$ can reflect a distance between the head of the vehicle and the short side of the parking space closest to the head of the vehicle, and the second distance $l_2$ can reflect a distance between the rear of the vehicle and the short side of the parking space closest to the rear of the vehicle. When the first distance $l_1$ and the second distance $l_2$ are smaller, the overall length of the vehicle is closer to the overall length of the parking space, and space utilization of the parking space is higher. An improper case is as follows: When available wireless charging parking spaces of a car are sufficient, a household car is parked in a wireless charging parking space provided for a large vehicle such as an electric truck. Therefore, in an embodiment of the application, in a process of filtering parking spaces, the first distance $l_1$ and the second distance $l_2$ are considered, so that cases in which a dedicated parking space for a large vehicle is matched for a small vehicle can be effectively reduced, and space utilization of the parking space can be improved.

In an embodiment, the first evaluation indicator $I_1$ may include a third distance $l_3$. The third distance $l_3$ is an absolute value of a difference between the first distance $l_1$ and the second distance $l_2$. The third distance $l_3$ may reflect distribution of remaining space at the head and the rear of the vehicle when the center of the wireless charging receiver of the vehicle overlaps the center of the wireless charging sender of the parking space. For example, for a first candidate parking space and a second candidate parking space that meet the matching condition, if the third distance $l_3$ of the first candidate parking space is smaller than the third distance $l_3$ of the second candidate parking space, remaining space at the head and the rear of the vehicle is distributed more evenly when the vehicle is parked in the first candidate parking space on the premise that it is ensured that the center of the wireless charging receiver of the vehicle directly faces the center of the wireless charging sender of the parking space, and when the vehicle is parked in the second candidate parking space, the remaining space at the head and the rear of the vehicle is uneven. Therefore, in an embodiment of the application, in a process of filtering parking spaces, by considering the third distance $l_3$, a parking space in which remaining space at the head and the rear of the vehicle is distributed more evenly may be recommended for the vehicle, so as to avoid a case in which the vehicle is placed closer to a short side of the parking space, for example, a small vehicle is placed closer to one side of a large parking space.

In an embodiment, the first evaluation indicator $I_1$ may include a fourth distance $l_4$.

In an embodiment, the fourth distance may be a total length of a driving path from the entrance of the parking lot to the candidate parking space. The fourth distance $l_4$ may reflect a total length of a path of the vehicle traveling from the entrance of the parking lot to the candidate parking space. A parking space with a small fourth distance $l_4$ has a shorter driving path, so that the vehicle can be parked more quickly. It should be noted that the fourth distance $l_4$ herein is the total length of the driving path, and a traffic indication situation in the parking lot is considered. For example, a one-way driving lane may exist in the parking lot. In consideration of compliance with directory signs in the parking lot, a parking space with a shortest straight-line distance from the vehicle is not necessarily a parking space with a shortest driving path. When a one-way driving lane exists between the vehicle and the candidate parking space, the vehicle needs to detour to reach the candidate parking space. The path from the entrance of the parking lot to the candidate parking space herein is the shortest driving path given in compliance with the traffic signs of the parking lot.

In an embodiment, the fourth distance $l_4$ may alternatively be a straight-line distance from the entrance of the parking lot to the candidate parking space. Considering that the vehicle or the user of the vehicle is more likely to find an idle parking space that is relatively close to the vehicle, when a candidate parking space with a smallest fourth distance is selected as the optimal parking space, the vehicle or the user of the vehicle can find the candidate parking space more quickly.

As described above, a result of the first evaluation indicator $I_1$ may be obtained by performing weighted calculation on one or more of influencing factors such as the second area $S_2$, the first distance $l_1$, the second distance $l_2$, the third distance $l_3$, and the fourth distance $l_4$. The second area $S_2$ is the difference between the area $S_r$ of the first sender and the first area $S_1$ of each parking space. The first distance $l_1$ is the difference between the first parking space length $l_{P1}$ and the first vehicle length $l_{C1}$. The second distance $l_2$ is the difference between the second parking space length $l_{P1}$ and the second vehicle length $l_{C1}$. The third distance $l_3$ is the absolute value of the difference between the first distance $l_1$ and the second distance $l_2$. The fourth distance $l_4$ is the total length of the driving path from the entrance of the parking lot to the candidate parking space. In an embodiment, the server selects a parking space with an optimal first evaluation indicator as an optimal parking space, and comprehensively considers factors such as a non-overlapping area of the sender, a parking space vacant area, and a driving distance from the entrance of the parking lot. A weight coefficient of each factor may be set based on an actual situation. Setting of the weight coefficient is not limited in an embodiment of the application.

FIG. 8-*b* is another possible schematic flowchart of selecting an optimal parking space. As shown in FIG. 8-*b*, in the wireless charging parking space recommendation method provided in an embodiment of the application, the parking space preferential selection algorithm may include: calculating a first evaluation indicator of each candidate parking space with reference to the first vehicle information. A candidate parking space with an optimal first evaluation indicator is selected as the optimal candidate parking space. The first evaluation indicator may be obtained by performing weighted calculation on one or more of factors such as the first area $S_1$, the second area $S_2$, the first distance $l_1$, the second distance $l_2$, the third distance $l_3$, and the fourth distance $l_4$. The parking space with the optimal first evaluation indicator $I_1$ is selected as the optimal parking space. When there are a plurality of parking spaces with a same first evaluation indicator $I_1$ in the parking lot, the server sorts the parking spaces with the same first evaluation indicator $I_1$ based on a priority sequence of factors, to select the optimal parking space.

It should be noted that, in an embodiment shown in FIG. 8-*b*, the first area $S_1$ is used as one of to-be-considered factors that constitute the first evaluation indicator $I_1$. Different from the implementation shown in FIG. 8-*a*, in the implementation shown in FIG. 8-*b*, the largest first area may not be used as the most important factor for consideration. In a possible case, the first area $S_1$ of the candidate parking space selected as the optimal parking space may not be the largest among all candidate parking spaces.

For example, when the first area $S_1$ of the first candidate parking space is smaller than the largest first area $S_{1max}$, but because the second area $S_2$ of the first candidate parking space is far smaller than the second area $S_2$ of the candidate parking space with the largest first area $S_{1max}$, the first evaluation indicator $I_1$ of the first candidate parking space is better than the first evaluation indicator $I_1$ of the parking space with the largest first area $S_{1max}$, the first candidate parking space may also be selected as the optimal parking space.

For another example, when the first area $S_1$ of the first candidate parking space is smaller than the largest first area $S_{1max}$, but because the fourth distance $l_4$ of the first candidate parking space is far less than the fourth distance $l_4$ of the candidate parking space with the largest first area $S_{1max}$, the first evaluation indicator $I_1$ of the first candidate parking space is better than the first evaluation indicator $I_1$ of the parking space with the largest first area $S_{1max}$, the first candidate parking space may also be selected as the optimal parking space.

It should be noted that, in the wireless charging parking space recommendation method provided in an embodiment of the application, a process of preferentially selecting a parking space is a process of recommending a preferential selection result to the user based on consideration of a preferential selection target on the basis that parking and wireless charging requirements of the first vehicle are met. The factors considered in the foregoing embodiment and the algorithms for the considered factors are merely examples, and are not intended to limit the solutions provided in this application.

It should be noted that in the wireless charging parking space recommendation method provided in an embodiment of the application, processes S403 and S404 of performing matching calculation on and filtering parking spaces may be performed by the parking lot server 200, or may be performed by the mobile terminal or the vehicular device. Embodiments provided in this application are not intended to limit an execution body of the embodiments.

S405: Send the parking space guidance information.

S405 may be performed by the parking lot server. After the target parking space is obtained after S403 or S404, the target parking space information is sent to the vehicular device 111, to guide the vehicle to travel to the target parking space. In an embodiment, when there is a wireless charging parking space that meets the parking requirement of the first vehicle, the parking lot server sends the first parking guidance information to the vehicular device 111.

It should be noted that, in an actual application scenario, the wireless charging sender of the parking space may be disposed on one side that is of the parking space and that deviates from a vertical bisector of the long side of the parking space, for example, disposed on one side close to the first short side, or disposed on one side close to the second short side. For the vehicle, the wireless charging receiver of the vehicle may also be disposed on one side close to the head of the vehicle, or disposed on one side close to the rear of the vehicle. In a process in which the vehicle is actually parked into a parking space, a plurality of parking manners, for example, forward parking or reverse parking, may be used.

The parking manner affects wireless charging efficiency of the vehicle in the parking space. Descriptions are as follows: On a premise that the parking space meets the matching condition for the first vehicle, the wireless charging receiver of the first vehicle is located at a position close to the head of the vehicle, and the wireless charging sender of the target parking space is located at one side close to the first short side. After the vehicle selects the reverse parking manner to be parked into the target parking space from the second short side, the head of the first vehicle is close to the second short side of the target parking space. In this example, because the wireless charging receiver of the first vehicle is close to the head of the vehicle, the projection of the wireless charging receiver in the plane of the parking space is far away from the first short side of the parking space, and is also far away from the wireless charging sender of the parking space close to the first short side. Therefore, the wireless charging receiver and the wireless charging sender in this example are relatively far away from each other, and it is difficult to face each other. In this case, even if the parking space meets the matching condition, it is difficult for the parking space to provide an efficient wireless charging service for the vehicle. When the first vehicle is parked into the target parking space from the second short side of the target parking space in the forward parking manner, after parking, the head of the first vehicle is close to the first short side of the target parking space. Because the wireless charging receiver of the first vehicle is close to the head of the vehicle, and is also close to the first short side, and the wireless charging sender of the target parking space is also disposed on one side close to the first short side, in the forward parking manner, it is easier for the wireless charging receiver of the first vehicle and the wireless charging sender of the target parking space to directly face each other at the center, so as to obtain relatively high wireless charging efficiency.

Therefore, to facilitate the wireless charging receiver of the first vehicle and the wireless charging sender of the parking space to directly face each other, in the wireless charging parking space recommendation method provided in an embodiment of the application, parking manner recommendation information may be further included.

In an embodiment, the first parking guidance information may further include parking manner recommendation information. The parking manner recommendation information may be obtained with reference to the first vehicle information based on a parking manner recommendation algorithm. The parking manner recommendation information may include a parking manner. The parking manner may include forward parking or reverse parking.

Figure 9:
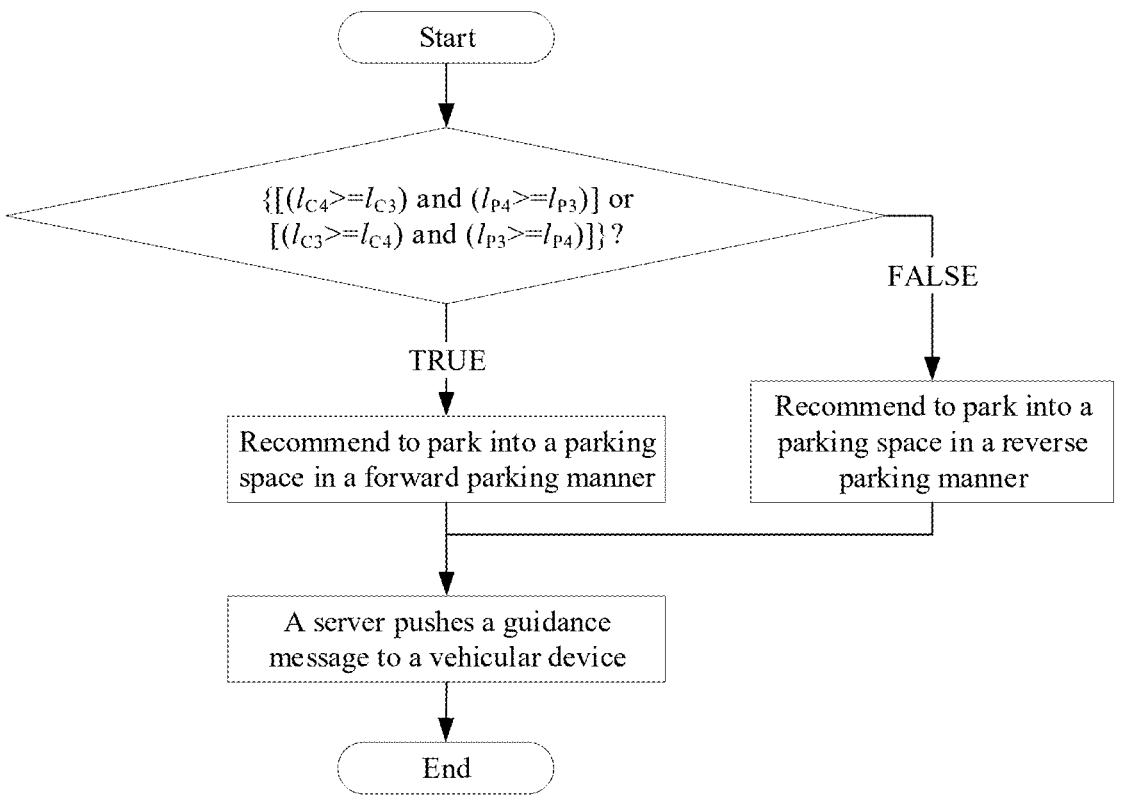
FIG. 9 is a schematic flowchart of selecting a vehicle parking direction according to an embodiment of this application.

FIG. 9 is a schematic flowchart of determining a vehicle parking direction. In the wireless charging parking space recommendation method provided in an embodiment, the parking manner recommendation algorithm may include: determining, with reference to the first vehicle information, whether a logic of the first parking condition is true or false. The first parking condition is $\{[(l_{C4}=l_{C3})$ and $(l_{P4}=l_{P3})]$ or $[((l_{C3}=l_{C4}))$ and $(l_{P3}=l_{P3})]\}$. $l_{C3}$ is the third vehicle length, $l_{C4}$ is the fourth vehicle length, $l_{P3}$ is the third parking space length, and $l_{P4}$ is the fourth parking space length. When the first parking condition is true, forward parking is used as the parking manner recommendation information. When the first parking condition is false, reverse parking is used as the parking manner recommendation information.

Figure 10:
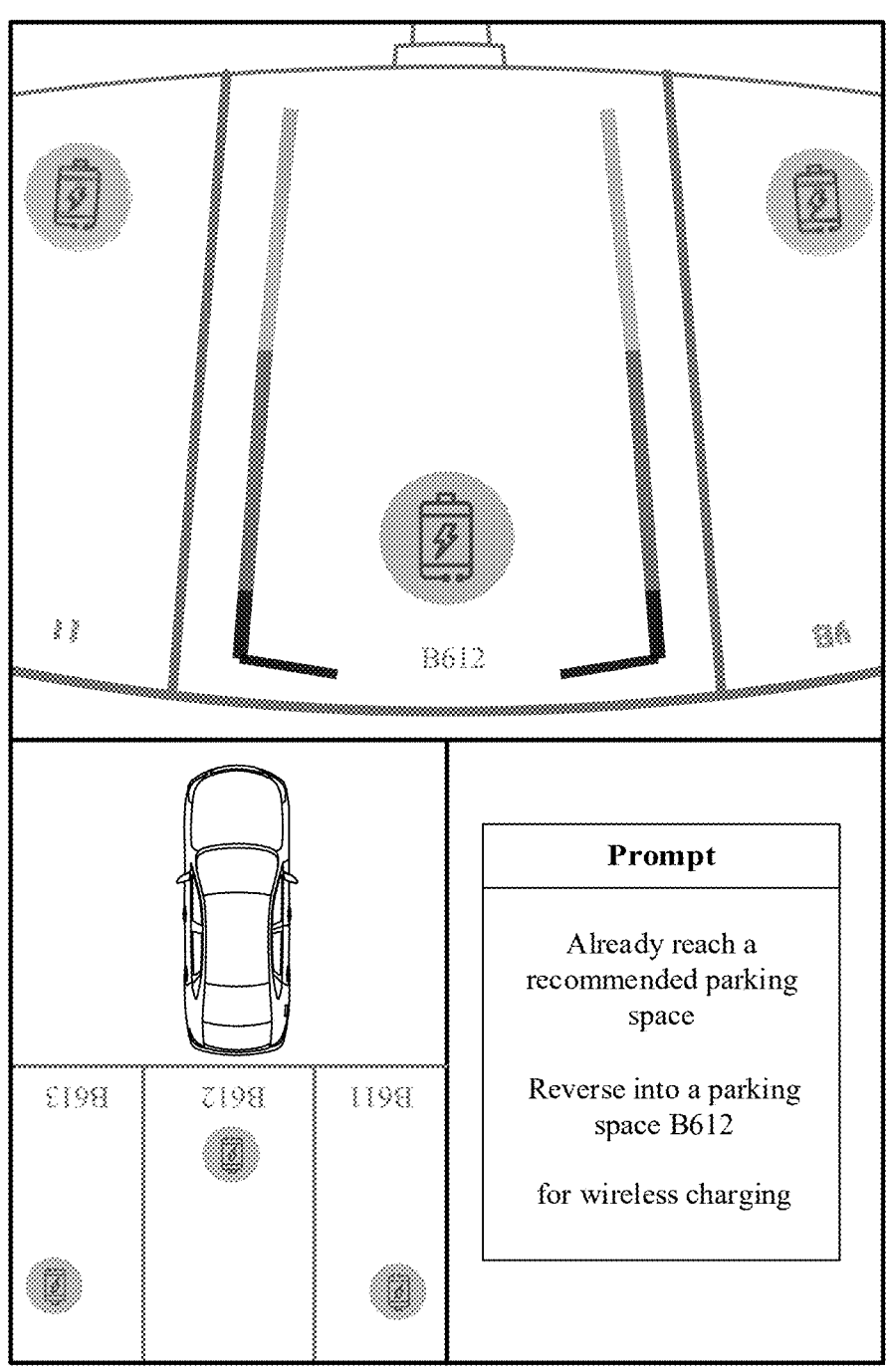
FIG. 10 is a schematic diagram of parking manner recommendation information according to an embodiment of this application.

FIG. 10 is a schematic diagram of parking manner recommendation information. As shown in FIG. 10, the vehicular device may present the parking manner recommendation information to the user, to prompt the user to park into a parking space in an appropriate manner, so that the wireless charging receiver of the vehicle directly faces the wireless charging sender of the parking space, so as to perform wireless charging.

When there is no wireless charging parking space that meets the parking requirement of the first vehicle, the server sends the second parking guidance information to the vehicular device (111), where the second parking guidance information may include notifying the terminal that there is no available wireless charging parking space.

In the wireless charging parking space recommendation method provided in an embodiment of the application, whether there is an available wireless charging idle parking space is determined, so that after entering the parking lot, the vehicle or the user can learn whether there is a required parking space in the parking lot, to avoid blind searching, thereby improving user experience.

In the wireless charging parking space recommendation method provided in an embodiment of the application, to select the optimal parking space, a wireless charging parking space with high charging efficiency, low energy waste, a good parking posture, and a short driving distance may be selected for the vehicle based on a vehicle status, to improve vehicle charging efficiency, improve parking space utilization, and reduce a driving time of the vehicle to the parking space.

In the wireless charging parking space recommendation method provided in an embodiment of the application, a vehicle or a driver may learn whether the vehicle should be parked into the parking space in a forward manner or a reverse manner before being driven into the parking space, to effectively avoid a case in which the wireless charging receiver of the vehicle cannot directly face the wireless charging sender of the parking space, so as to effectively reduce a possibility of parking lot congestion caused by repeated parking, thereby improving parking experience of the driver.

The wireless charging parking space recommendation method provided in an embodiment of the application has relatively good adaptability in an implementation process. In an embodiment, only vehicle size information needs to be provided to the parking lot server, and the parking lot server completes calculation and determining. Therefore, in an embodiment, the vehicle does not need to be additionally provided with a sensor and a processor with a relatively high computing capability to obtain parking environment information. This implementation can be implemented in an existing automobile architecture, and is conducive to popularization and promotion.

In addition, an embodiment of this application further provides a server, including a communication module, a storage module, and a control module. The server can perform the foregoing parking space recommendation method.

An embodiment of this application provides a vehicular device, including a communication module, a storage module, and a control module. The vehicular device can perform the foregoing parking space recommendation method.

In an embodiment, the vehicular device is mounted on a first vehicle, and the first vehicle includes a wireless charging receiver.

In an embodiment, the vehicular device is a mobile terminal. In an embodiment, the vehicular device is a mobile phone.

An embodiment of this application provides a system, including any one of the foregoing servers and any one of the foregoing vehicular devices.

An embodiment of this application provides a vehicle, including any one of the foregoing vehicular devices.

An embodiment of this application further provides a computer-readable storage medium, including a program. When the program is run on a computer, the computer is enabled to perform the foregoing parking space recommendation method.

An embodiment of this application provides a computer program product. When the computer program product is run on a computer, the computer is enabled to perform the foregoing parking space recommendation method.

An embodiment of this application provides a control unit, including programmable instructions. When the programmable instructions are invoked, the foregoing parking space recommendation method can be performed.

An embodiment of this application provides a chip. The chip is coupled to a memory, and is configured to execute a program stored in the memory, to perform the foregoing parking space recommendation method.

The foregoing descriptions are merely implementations of this application, but the protection scope of this application is not limited thereto. Any variation or replacement readily figured out by one skilled in the art within the technical scope disclosed in this application shall fall within the scope disclosed in this application. Therefore, the protection scope of this application shall be subject to the protection scope of the claims.

What is claimed is:

1. A parking recommendation method, comprising:
obtaining, by a processor, first vehicle information of a first vehicle having a wireless charging receiver;
obtaining, by the processor, parking space information including size and position information of a wireless charging sender of at least one parking space;
identifying, by the processor based on the first vehicle information and the parking space information, a wireless charging parking space that meets a parking requirement of the first vehicle by selecting of an optimal parking space for the first vehicle, including:
calculating a second evaluation indicator of at least one candidate parking space, wherein the second evaluation indicator comprising a first area, wherein the first area is an overlapping part between projections of a first receiver and a first sender on ground when a center of the first receiver of the first vehicle overlaps a center of the first sender of each candidate parking space; and
selecting a candidate parking space having an optimal second evaluation indicator as the optimal parking space;
when the wireless charging parking space that meets the parking requirement of the first vehicle exists, sending, by the processor, first parking guidance information to the first vehicle; and
controlling, by the processor, the first vehicle to the wireless charging parking space based on the first parking guidance information.

2. The method according to claim 1, wherein the first vehicle information comprises size information of the first vehicle.

3. The method according to claim 2, wherein the first vehicle information further comprises size and position information of the wireless charging receiver in the first vehicle.

4. The method according to claim 1, wherein before the identifying of the wireless charging parking space that meets the parking requirement of the first vehicle, the method further comprises: obtaining the parking space information, wherein the parking space information comprises size and position information of the at least one parking space.

5. The method according to claim 1, wherein the identifying of the wireless charging parking space that meets the parking requirement of the first vehicle comprises:
identifying an available wireless charging parking space as the candidate parking space.

6. The method according to claim 5, wherein the identifying of the available wireless charging parking space comprises:
identifying the wireless charging parking space that meets a size requirement of the first vehicle; and
the identifying of the wireless charging parking space that meets the size requirement of the first vehicle comprises:
obtaining a first vehicle length and a second vehicle length of the first vehicle;
selecting a parking space whose first parking space length is greater than the first vehicle length and whose second parking space length is greater than the second vehicle length as the candidate parking space, wherein
the first vehicle length is the larger length of a third vehicle length and a fourth vehicle length;
the second vehicle length is the smaller length of the third vehicle length and the fourth vehicle length;

the third vehicle length is a longitudinal distance from the center of the wireless charging receiver of the first vehicle to a head of the first vehicle;

the fourth vehicle length is a longitudinal distance from the center of the wireless charging receiver of the first vehicle to a rear of the first vehicle;

the first parking space length is the larger length of a third parking space length and a fourth parking space length;

the second parking space length is the smaller length of the third parking space length and the fourth parking space length;

the third parking space length is a longitudinal distance from the center of a wireless charging sender of the first parking space to a first short side of the first parking space; and the fourth parking space length is a longitudinal distance from the center of the wireless charging sender of the first parking space to a second short side of the first parking space.

7. The method according to claim 6, wherein the first short side is a side of the first parking space that does not allow the first vehicle to enter; and the second short side is a side of the first parking space allows the first vehicle to enter.

8. The method according to claim 1, wherein the identifying of the wireless charging parking space that meets the parking requirement of the first vehicle further comprises:

selecting the optimal parking space for the first vehicle, wherein the selecting of the optimal parking space for the first vehicle comprises:

calculating the first area of the at least one candidate parking space, wherein the first area is the overlapping part between the projections of the first receiver and the first sender on the ground when the center of the first receiver of the first vehicle overlaps the center of the first sender of each candidate parking space; and selecting the candidate parking space having the largest first area as the optimal parking space.

9. The method according to claim 8, wherein after the selecting of the candidate parking space having the largest first area as the optimal parking space, the method further comprises:

calculating a first evaluation indicator of at least one optimal parking space; and selecting the optimal parking space having an optimal first evaluation indicator as the optimal parking space.

10. The method according to claim 9, wherein the first evaluation indicator comprises a second area, and the second area is a difference between the first sender and the first area of each candidate parking space;

or, the first evaluation indicator comprises a first distance and a second distance, wherein the first distance is a difference between the first parking space length and the first vehicle length; and the second distance is a difference between the second parking space length and the second vehicle length;

or, the first evaluation indicator comprises a third distance, and the third distance is an absolute value of a difference between the first distance and the second distance;

or, the first evaluation indicator comprises a fourth distance, and the fourth distance is a total length of a driving path from an entrance of a parking lot to the candidate parking space;

or, the first evaluation indicator is obtained by performing weighted calculation on the second area, the first distance, the second distance, the third distance, and the fourth distance, wherein the second area is a difference between the first sender and the first area of each parking space;

the first distance is a difference between the first parking space length and the first vehicle length; and the second distance is a difference between the second parking space length and the second vehicle length;

the third distance is the absolute value of a difference between the first distance and the second distance; and the fourth distance is the total length of the driving path from the entrance of the parking lot to the candidate parking space.

11. The method according to claim 1, wherein the second evaluation indicator is obtained by performing weighted calculation on the first area, a second area, a first distance, a second distance, a third distance, and a fourth distance, wherein the first area is an overlapping part between projections of the first receiver and the first sender on ground when the center of the first receiver of the first vehicle overlaps the center of the first sender of each candidate parking space;

the second area is a difference between the first sender and the first area of each parking space;

the first distance is a difference between a first parking space length and a first vehicle length; and the second distance is a difference between a second parking space length and a second vehicle length;

the third distance is an absolute value of a difference between the first distance and the second distance; and the fourth distance is a total length of a driving path from an entrance of a parking lot to the candidate parking space.

12. The method according to claim 1, wherein before the sending of first parking guidance information to the first vehicle, the method further comprises:

calculating a parking manner of the optimal parking space, comprising:

when a first parking condition of the optimal parking space is true, selecting forward parking as the parking manner, wherein the first parking condition is {[(V4>=V3) and (P4>=P3)] or [(V3>=V4) and (P3>=P4)]}, wherein V3 is a third vehicle length, V4 is a fourth vehicle length, P3 is a third parking space length, and P4 is a fourth parking space length.

13. The method according to claim 12, wherein the calculating of the parking manner of the optimal parking space comprises:

when the first parking condition of the optimal parking space is false, selecting reverse parking as the parking manner, wherein the first parking condition is {[(V4>=V3) and (P4>=P3)] or [(V3>=V4) and (P3>=P4)]}, wherein V3 is the third vehicle length, V4 is the fourth vehicle length, P3 is the third parking space length, and P4 is the fourth parking space length.

14. The method according to claim 1, wherein the sending of first parking guidance information to the first vehicle comprises:

sending, to the first vehicle, position information and path planning information of a parking space that meets the parking requirement of the first vehicle.

15. The method according to claim 14, wherein the sending of first parking guidance information to the first vehicle further comprises:

sending parking manner information of the optimal parking space to the first vehicle, wherein the parking manner information comprises forward parking or reverse parking.

16. The method according to claim 1, wherein when the wireless charging parking space that meets the parking requirement of the first vehicle does not exist, second parking guidance information is sent to the first vehicle.

17. A non-transitory machine-readable storage medium having instructions stored therein, which when executed by a processor, cause the processor to perform operations, the operations comprising:

obtaining first vehicle information of a first vehicle;

obtaining parking space information including size and position information of a wireless charging sender of at least one parking space;

identifying, based on the first vehicle information and the parking space information, a wireless charging parking space that meets a parking requirement of the first vehicle by selecting of an optimal parking space for the first vehicle, including:

calculating a second evaluation indicator of at least one candidate parking space, wherein the second evaluation indicator comprising a first area, wherein the first area is an overlapping part between projections of a first receiver and a first sender on ground when a center of the first receiver of the first vehicle overlaps the center of the first sender of each candidate parking space; and selecting a candidate parking space having an optimal second evaluation indicator as the optimal parking space;

when the wireless charging parking space that meets the parking requirement of the first vehicle exists, sending first parking guidance information to the first vehicle;

controlling the first vehicle to the wireless charging parking space based on the first parking guidance information.

18. A data processing system, comprising:

a processor, and a memory coupled to the processor to store instructions, which when executed by the processor, cause the data processing system to:

obtain first vehicle information of a first vehicle;

obtain parking space information including size and position information of a wireless charging sender of at least one parking space;

identify, based on the first vehicle information and the parking space information, a wireless charging parking space that meets a parking requirement of the first vehicle by selecting of an optimal parking space for the first vehicle, including:

calculating a second evaluation indicator of at least one candidate parking space, wherein the second evaluation indicator comprising a first area, wherein the first area is an overlapping part between projections of a first receiver and a first sender on ground when a center of the first receiver of the first vehicle overlaps the center of the first sender of each candidate parking space; and selecting a candidate parking space having an optimal second evaluation indicator as the optimal parking space;

when the wireless charging parking space that meets the parking requirement of the first vehicle exists, send first parking guidance information to the first vehicle;

control the first vehicle to the wireless charging parking space based on the first parking guidance information.

\* \* \* \* \*